US011454969B2

(12) United States Patent
Pantanelli

(10) Patent No.: US 11,454,969 B2
(45) Date of Patent: Sep. 27, 2022

(54) METHOD TO INVESTIGATE HUMAN ACTIVITIES WITH ARTIFICIAL INTELLIGENCE ANALYSIS IN COMBINATION WITH LOGIC AND CONTEXTUAL ANALYSIS USING ADVANCED MATHEMATIC

(71) Applicant: Georges Pierre Pantanelli, Houston, TX (US)

(72) Inventor: Georges Pierre Pantanelli, Houston, TX (US)

( * ) Notice: Subject to any disclaimer, the term of this patent is extended or adjusted under 35 U.S.C. 154(b) by 869 days.

(21) Appl. No.: 16/351,044

(22) Filed: Mar. 12, 2019

(65) Prior Publication Data

US 2019/0212739 A1    Jul. 11, 2019

(51) Int. Cl.

| G06N 3/02 | (2006.01) |
|---|---|
| G05D 1/00 | (2006.01) |
| G05B 13/02 | (2006.01) |
| G06F 40/30 | (2020.01) |
| G06N 3/00 | (2006.01) |

(52) U.S. Cl.
CPC ......... G05D 1/0088 (2013.01); G05B 13/027 (2013.01); G06F 40/30 (2020.01); G06N 3/002 (2013.01); *G05D 2201/0213* (2013.01)

(58) Field of Classification Search
CPC ......... G05D 1/0088; G05D 2201/0213; G05B 13/027; G06F 40/30; G06N 3/002; G06N 3/0427; G06N 3/08; G06N 5/025; G06N 5/045
USPC .......................................................... 703/2
See application file for complete search history.

(56) References Cited

U.S. PATENT DOCUMENTS

| 9,660,995 | B2 * | 5/2017 | Reiter | H04L 63/0428 |
|---|---|---|---|---|
| 9,860,391 | B1 * | 1/2018 | Wu | H04M 15/8061 |
| 2017/0061305 | A1 * | 3/2017 | Xiong | G06N 5/048 |

* cited by examiner

*Primary Examiner* — Charlotte M Baker

(57) ABSTRACT

The method solves several problems to assist the investigation of human activities, by creating a human activities set of objects, by using an advanced mathematic computation algorithm and a time-based n-dimensional space-curves formula $F_i$ algorithm, by using matrices calculus and tensors calculus, by incorporating artificial intelligence analysis in combination with logic and contextual analysis to create a time-based human activities universal processor. The method extracts time-based escalating risk and priority concepts, anomalous understanding and time-based ranking information, generating action to take, identifying present and predicting future object position, motion and behavior. When, this method is loaded as an application on an automotive and a machine, the method will be at home replacing a human.

46 Claims, 20 Drawing Sheets

FIG. 1B

| | |
|---|---|
| 107 several time-based human activities sub-parsing group formatted as matrices element indices | |
| 108 with relationship to rich set of object table rich word dictionary table formatted as matrices element indices module | using an artificial intelligence analysis in combination with logic and contextual analysis module 124 |
| human biometric database 109 | with iterative processing using advanced mathematic computation algorithm 125 |
| formatted as matrices element indices | time-based n-dimensional space-curves formula Fi algorithm |
| picture, object silhouette model for human, animal and object 110 | using a logic and contextual analysis module to solve ambiguity 126 |
| formatted as matrices element indices | and when ambiguity is unsolved 127 |
| automotive 111 | security | military | the artificial intelligence neural network module to solve ambiguity 128 |
| formatted as matrices element indices | |
| driving code highway rule 112 | agency or corporation | military MIL | time-based group (1) gathering and grouping sub-parsing group by apparatus and object with their matrices element indices to populate group (1) matrices element indices 129 |
| with complete details and elements matrices indices | time-based group (2) aggregating several group (1) matrices element indices to generate and to populate group (2) matrices element indices 130 |
| automotive contextual 113 | security contextual | specific contextual | gathering all group (2) using advanced mathematic computation algorithm 131 |
| with interpretation and formatted as matrices element indices | to generate a time-based correlation n-dimensional tensor with its element indices 132 |

FIG. 1C

| | to generate a time-based correlation n-dimensional tensor with its element indices 132 |
|---|---|
| 114 priorities scaling | using the contextual ranking module with advanced mathematic computation algorithm time-based n-dimensional space-curves formula algorithm 133 |
| 115 for each priority in a category the scaling element indices formatted as matrices element indices | to extract formatted as matrices element 134 indices |
| | time-based escalating risk concept 135 |
| | 136 time-based escalating priority concept |
| | 137 time-based anomalous understanding |
| | 138 time-based ranking information |
| | 139 with time-based action to take |

FIG. 2B

200—Tensor

220  Tensor $t^{j_1,j_2,j_3}_{i_1,i_2,i_z,t_1}$ same based-time with $e^{j_1,j_2,j_3}_{i_1,i_2,i_z,t_1}$ Tensor based-time with $e^{j_1}_{i_1,i_2,i_z,t_1}$ 221 layer $j_1$

Tensor based-time with $e^{j_2}_{i_1,i_2,i_z,t_1}$ 222 layer $j_2$

Tensor based-time with $e^{j_3}_{i_1,i_2,i_z,t_1}$ 223 layer $j_3$

| column | 1 | 2 | 3 |
|---|---|---|---|
| row 1 | $i_1,j_1,i_z,t_1$ | $e_{i2,1,iz,it}$ | $e_{i3,1,iz,it}$ |
| row 2 | $i_1,j_2,i_z,t_1$ | $e_{i2,2,iz,it}$ | $e_{i3,2,iz,it}$ |
| row 3 | $i_1,j_3,i_z,t_1$ | $e_{i2,3,iz,it}$ | $e_{i3,3,iz,it}$ |

FIG. 4A

| | | | |
|---|---|---|---|
| 400 | time-based human activities universal processor module dedicated to automotive | | |
| 401 | with relationship rich universal dictionary table module dedicated to automotive | 421 | using artificial intelligence analysis in combination with logic and contextual analysis |
| 402 | a time-based look-out human activities apparatus to acquire and to broadcast | 422 | with optional appending on artificial intelligence neural network module |
| 403 | road and traffic | 423 | for driving on snow |
| 404 | other vehicle, pedestrian | 424 | for driving on ice |
| 405 | panel, traffic light | 425 | others |
| 406 | to be stored in a temporary information identification | 426 | to generate time-based |
| 407 | the look-out apparatus to answer and to broadcast | 427 | correlation n-dimensional tensors element indices |
| 408 | automotive information identification | 428 | time based ranking information |
| 409 | with | 429 | time based action to take |
| 410 | automotive's make and type | 430 | identified information |
| 411 | speed, acceleration, deceleration | 431 | enter |
| 412 | driving movement intent | 432 | in a temporary database |
| 413 | and traffic, vehicle, pedestrian in its range | 433 | automotive time-based information exchange module |
| 414 | automotive identification | | |

| | |
|---|---|
| automotive identification time-based information exchange module | 480 |

FIG. 7A

| | | | |
|---|---|---|---|
| 700 | time-based human activities universal processor as an application | | |
| 701 | with relationship to a rich universal dictionary table combining a rich set of object dictionary table to a rich word dictionary table formatted as matrices element indices | 720 | using the artificial intelligence analysis in combination with logic and contextual analysis module |
| 702 | time-based human activities information analysis | | |
| 703 | with the relationship between rich set of object dictionary table and the rich word dictionary table | | |
| 704 | time-based human activities information matrices element indices | | |
| 721 | using the artificial intelligence neural network appended with machine to machine analysis capability advanced mathematic algorithm time-based n-dimensional space-curves formula $F_i$ algorithm | | |
| 705 | with the time-based information exchange module | | |
| 706 | identification formatted as matrices element indices in an information table | 722 | to generate and extract |
| | | 723 | time-based human activities understanding |
| 707 | as a machine to machine communication | | |
| 708 | for machine to human communication using a time-based human activities universal processor dedicated to natural language analysis | | |
| 709 | with relationship to the rich word dictionary table module | 730 | using artificial intelligence analysis in combination with semantic and contextual analysis module |
| 710 | from word human activities understanding | 731 | with the artificial intelligence neural network section for natural language analysis |
| 711 | to generate and to communicate as text for a human communication | | |
| 705 | the time-based information exchange module with advanced mathematic computation algorithm time-based n-dimensional space-curves formula $F_i$ algorithm | 732 | time-based escalating risk concept time-based escalating priority time-based anomalous understanding time-based ranking information time-based action to take and behavior |
| 714 | apparatus identification matrices element indices | 736 | being store in the neural computing apparatus |

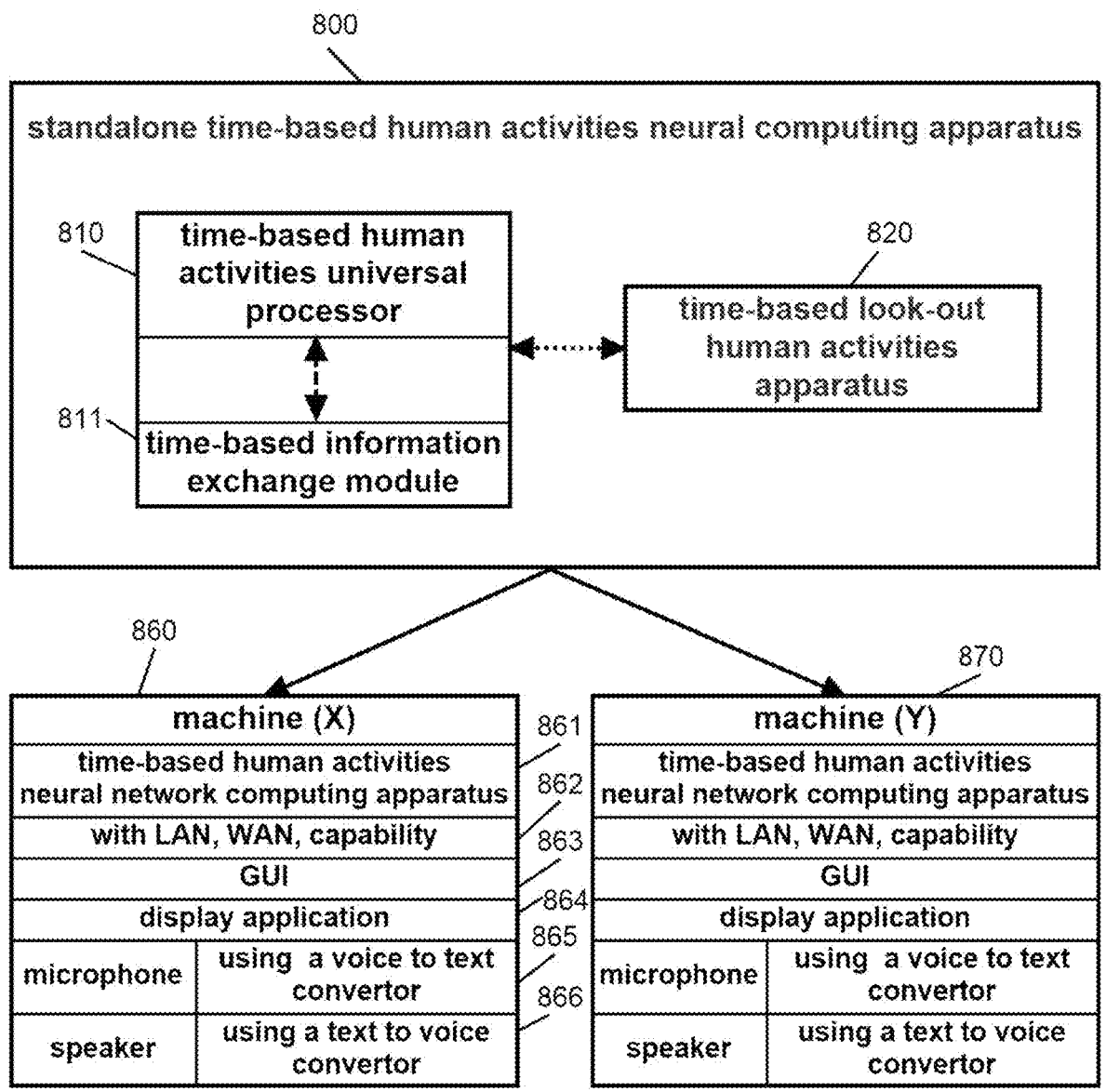

METHOD TO INVESTIGATE HUMAN ACTIVITIES WITH ARTIFICIAL INTELLIGENCE ANALYSIS IN COMBINATION WITH LOGIC AND CONTEXTUAL ANALYSIS USING ADVANCED MATHEMATIC

FIELD OF THE INVENTION

The embodiment of this invention is analyzing time-based human activities such as gathering of people, group or mass meeting, automotive driving, by employing artificial intelligence analysis in combination with logic and contextual analysis using advanced mathematic to extract from this analysis action to take or to predict a behavior.

BACKGROUND

Many activities such as component movement and identification in storage and manufacturing, robotic and security in home and automotive driving have already started to implement artificial intelligence to assist a human. The trend is to growth from assistance to a full replacement.

BRIEF DESCRIPTION OF THE DRAWING

FIG. 1B shows how the artificial intelligence analysis in combination with logic and contextual analysis processes.

FIG. 1C shows from the time-based correlation n-dimensional tensor with its element indices how using the contextual ranking module to extract time-based escalating concept information.

FIG. 2B shows three tensors time-based $t_1$.

FIG. 4A shows a block diagram illustrating how the method processes the relationship between automotive while driving.

FIG. 7A shows a block diagram illustrating how the method creates a standalone on the time-based neural computing apparatus incorporating the time-based human activities universal processor module as an application.

FIG. 8 shows a block diagram illustrating how the method by integrating the standalone on the time-based neural computing apparatus is used in a machine as an assistant to replace a human.

DETAILED DESCRIPTION

The method solves several problems while using artificial intelligence to investigate and to analyze time-based human activities:

1. By creating a time-based human activities universal processor using artificial intelligence analysis in combination with logic and contextual analysis.
2. Performing the artificial intelligence analysis using an artificial intelligence neural network.
3. With organizing the human activities investigation.
   a. By creating from the human activities, a set of objects database information formatted as matrices element indices and identifying each individual object with matrices element indices.
   b. By creating between an object formatted as matrices element indices and its corresponding word formatted as matrices element indices a direct relationship, by associating pictures of object, human, animal to words describing meaning, connotation, motion, activity as $M(i_1, i_2, \text{to } i_n)$.
   c. By creating an advanced mathematic computation algorithm.
   d. By appending this advanced mathematic computation algorithm capability to the artificial intelligence neural network of the time-based human activities universal processor.
   e. By creating a time-based n-dimensional space-curves formula $F_i$ algorithm.
   f. By appending this time-based n-dimensional space-curves formula $F_i$ algorithm computation capability to the artificial intelligence neural network of the time-based human activities universal processor.
   g. Therefore, having created in the time-based human activities universal processor, the advanced mathematic computation algorithm and the time-based n-dimensional space-curves formula $F_i$ algorithm computation capabilities.
   h. By using the time-based human activities universal processor to analyze the set of objects database information with their matrices element indices by using these matrices element indices as input information, with many multiple time-based human activities classifications, object, motion and many more other concepts where the elements indices are configured with several matrices element indices as $i_1$ to $i_n$ to be positioned in the corresponding matrices or tensors elements with subscript element indices $i_1$, $i_2$, $i_3$ and with superscript element indices as $j_1$ to $j_n$.

Figure 2A:
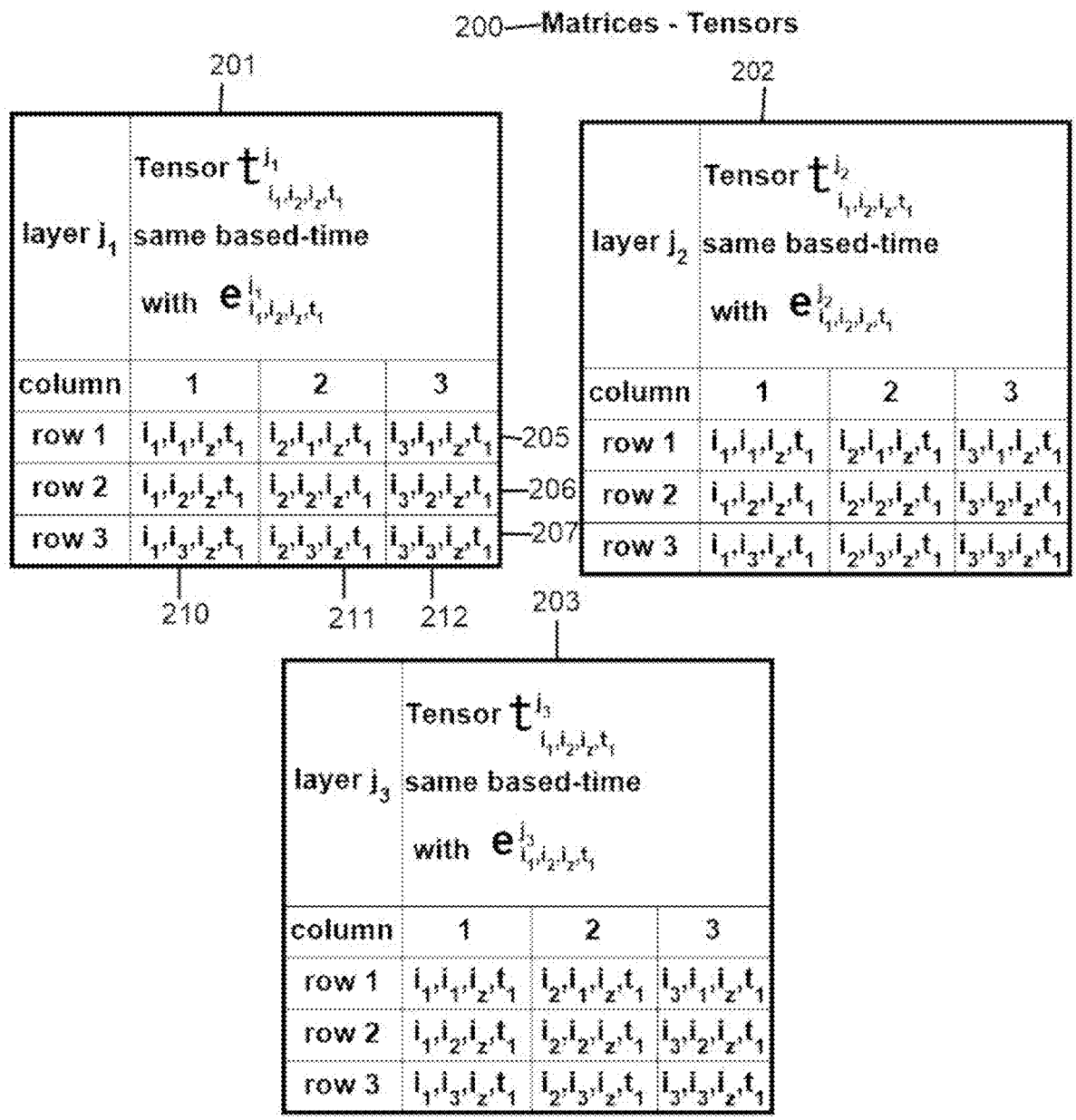
FIG. 2A shows in the method the relationship between matrices and tensors.
Figure 3:
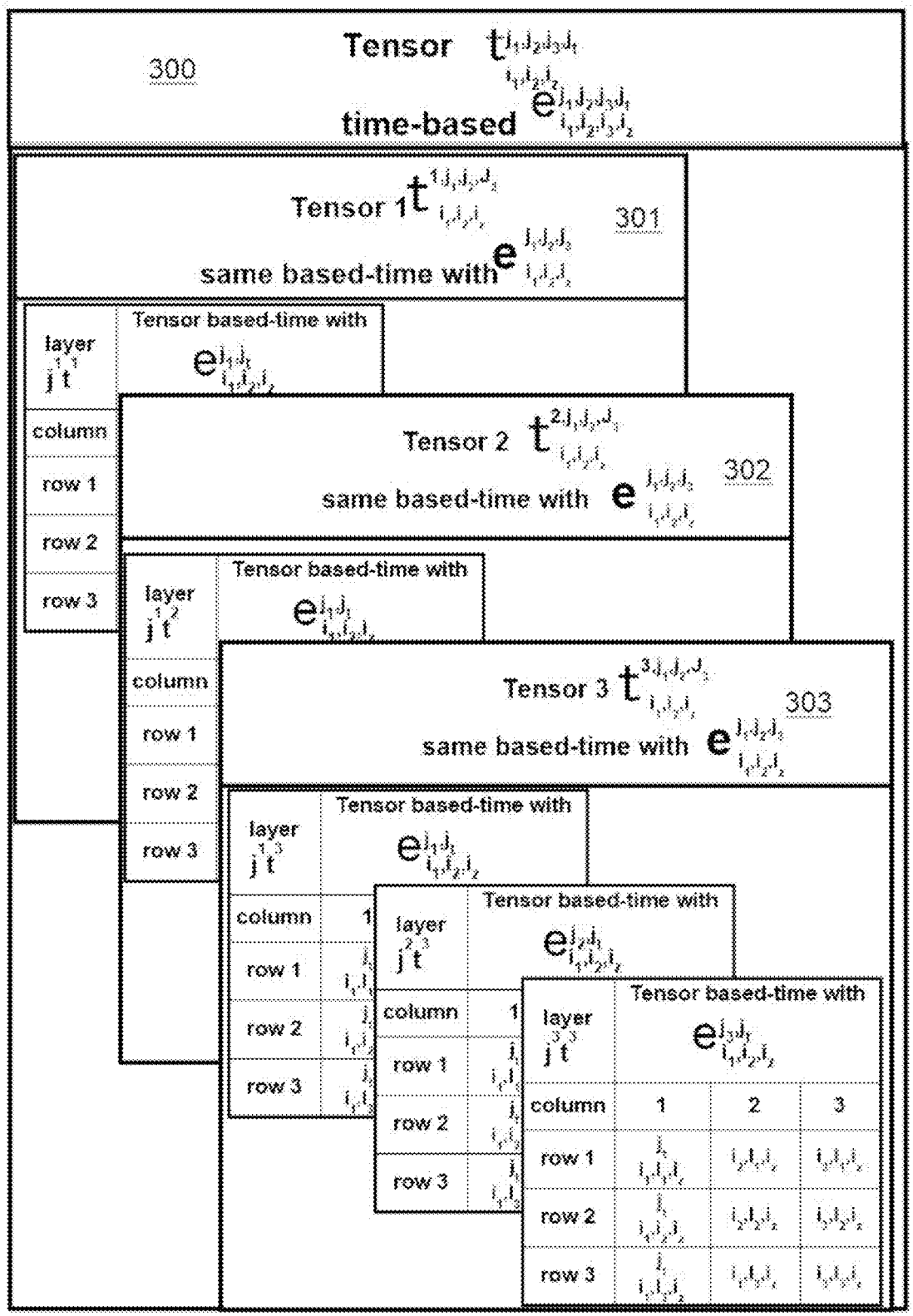
FIG. 3 shows how one embodiment of the method is built in a n-dimensional tensor.

A tensor of order 2, being a matrix implementation with row (x) and column (y) with element indices e=$i_1$, $i_1$, $i_3$ (see FIGS. 2A and 2B), while for time-based and higher correlation comparison and ranking, in a n plurality of connotation, languages, classification for multi-level correlation, the tensor computation is required with superscript elements indices e=$j_1$, $j_2$, $j_3$, $j_t$, where $j_t$ being the time-based element indices and subscript element indices e=$i_1$, $i_2$, $i_3$ (see FIG. 3).

i. By creating time-based human activities group and sub-group and in a n-plurality of connotation, classification for multi-level correlation formatted as tensor element indices to populate the corresponding time-based human activities n-dimensional tensors formatted as tensor element indices.

j. By gathering all (or some) time-based human activities sub-parsing groups n-dimensional tensors with their matrices element indices.

k. By generating a time-based human activities correlation n-dimensional tensor with its element indices and the time-based human activities contextual ranking formatted as matrices element indices.

l. To create a time-based human activities n-dimensional ranking tensor with subscript element indices e=$i_1$, $i_2$, to $i_n$ and superscript e=$j_1$, $j_2$, to $j_n$, $j_t$ where jt being the time-based, that permit to create very sophisticated time-based human activities comparison and ranking formatted as matrices element indices.

m. To extract time-based human activities escalating risk concept, time-based human activities escalating priority concept, time-based human activities anomalous understanding, time-based human activities ranking information formatted as matrices element indices, and a set of objects time-based human activities ranking information formatted as matrices element indices.

n. Time-based human activities action to take formatted as matrices element indices.

o. To extract time-based human and objects motion, behavior and to predict human and objects future time-based motion, behavior formatted as matrices element indices.

The method creates an advanced mathematic computation algorithm. This algorithm from the human activities implemented as a set of objects formatted as matrices element indices organizes the gathering of all or some object matrices element indices. Then distributes those matrices element indices to populate several elements of human activities sub-parsing group matrices, using connotation, fields and classifications formatted as matrices element indices. This algorithm uses matrices calculus, and tensors calculus, such as matrix addition, grouping, multiplication, tensor product, transposition, association, comparing and correlating some or all matrices rows, columns and layers tensors element indices to assist the time-based human activities universal processor to generate the time-based correlation n-dimensional tensors with element indices. Then to extract all human activities time-based information formatted as matrices element indices, such as time-based human activities ranking, priority and behavior. This advanced mathematic computation algorithm is incorporated in the time-based human activities universal processor application by appending the artificial intelligence neural network.

The method creates a time-based n-dimensional space-curves formula $F_i(p_{i1}, p_{i2}$, to $p_{in}, r_{\Theta\alpha i1}, r_{\Theta\alpha i2}$, to $r_{\Theta\alpha in}, r_{\Theta\beta i1}, r_{\beta i2}$, to $r_{\Theta\beta in}, r_{\Theta\gamma i1}, r_{\Theta\gamma i2}$, to $r_{\Theta\gamma in}$, $ax_i$, $by_i$, $cz_i$, $dt_i$) to monitor object motion, position and behavior formatted as matrices element indices with three complementary set of parameters (1) the a, b, c, d parameters linking to the object situation x, y, z with time t, (2) the $p_{i1}$, $p_{i2}$, to $p_{in}$ parameters linking to the monitoring activities such as position, motion, behavior; to the context, security, medical, automotive, military; to the object, human, animal, vehicle; to the environment, road, street, parkland, building, people gathering, to others rules and conditions and (3) the $r_{\Theta\alpha i1}$, $r_{\Theta\alpha i2}$, to $r_{\Theta\alpha in}$, $r_{\Theta\beta i1}$, $r_{\beta i2}$, to $r_{\Theta\beta in}$, $r_{\Theta\gamma i1}$, $r_{\Theta\gamma i2}$, to $r_{\Theta\gamma in}$ parameters linking to motion or behavior rotation for each single $\Theta_\alpha$, $\Theta_\beta$ and $\Theta_\gamma$ angle rotation. The clockwise or counterclockwise rotation matrices element indices $r_{\Theta\alpha i1}, r_{\Theta\alpha i2}$, to $r_{\Theta\alpha in}, r_{\Theta\beta i1}$, $r_{\Theta\beta i2}$, to $r_{\Theta\beta in}, r_{\Theta\gamma i1}, r_{\Theta\gamma i2}$, to $r_{\Theta\gamma in}$ are calculated for object situation $x_{i1}$, $x_{i2}$, $x_{i3}$ using the Euler matrix single angle rotation notation matrices element indices. Respectively creating the matrices $R_{\alpha i1}$, $R_{\beta i1}$ and $R_{\gamma i1}$ for each single $\Theta_\alpha$, $\Theta_\beta$ and $\Theta_\gamma$ angle rotation, where $R_{\alpha i1}=r_{\alpha i1}$, $r_{\alpha i2}$, to $r_{\alpha in}$ matrices element indices, $R_{\beta i1}=r_{\beta i1}$, $r_{\beta i1}$, to $r_{\beta in}$, matrices element indices and $R_{\gamma i1}=r_{\gamma i1}$, $r_{\gamma i2}$, to $r_{\gamma in}$ matrices element indices. Then for the $\Theta_\alpha+\Theta_\beta+\Theta_\gamma$ rotations using matrices multiplication to create the matrix $R_{\Theta\alpha i1, \Theta\beta i1, \Theta\gamma i2}=R_{\alpha i1}$, $R_{\beta i1}$, $R_{\gamma i1}$ generating its matrices element indices $r_{\Theta\alpha i1}$, $r_{\Theta\alpha i2}$, to $r_{\Theta\alpha in}, r_{\Theta\beta i1}, r_{\Theta\beta i2}$, to $r_{\Theta\beta in}, r_{\Theta\gamma i1}, r_{\Theta\gamma i2}$, to $r_{\Theta\gamma in}$ and the $F_i(p_{i1}, p_{i2}$, to $p_{in}, r_{\Theta\alpha i1}, r_{\Theta\alpha i2}$, to $r_{\Theta\alpha in}, r_{\Theta\beta i1}, r_{\Theta\beta i2}$, to $r_{\Theta\beta in}, r_{\Theta\gamma i1}, r_{\Theta\gamma i2}$, to $r_{\Theta\gamma in}$, $ax_i$, $by_i$, $cz_i$, $dt_i$). of the time-based n-dimensional space-curves formula $F_i$ algorithm. The method in the time-based n-dimensional space-curves formula $F_i$ algorithm utilizes a least squares estimation of non-linear parameters algorithm, for a time $t_i$ position $P_i(x_i, y_i, z_i, t_i)$ comparing estimated object motion, position and behavior to the object actual object motion, position and behavior to calculate the $p_{i1}$, $p_{i2}$, to $p_{in}$ parameters, the a, b, c, d parameters and the $r_{\Theta\alpha i1}$, $r_{\Theta\alpha i2}$, to $r_{\Theta\alpha in}, r_{\Theta\beta i1}, r_{\beta i2}$, to $r_{\Theta\beta in}, r_{\Theta\gamma i1}, r_{\Theta\gamma i2}$, to $r_{\Theta\gamma in}$. This time-based n-dimensional formula $F_i$ algorithm is incorporated in the time-based human activities universal processor application by appending the artificial intelligence neural network.

Figure 5A:
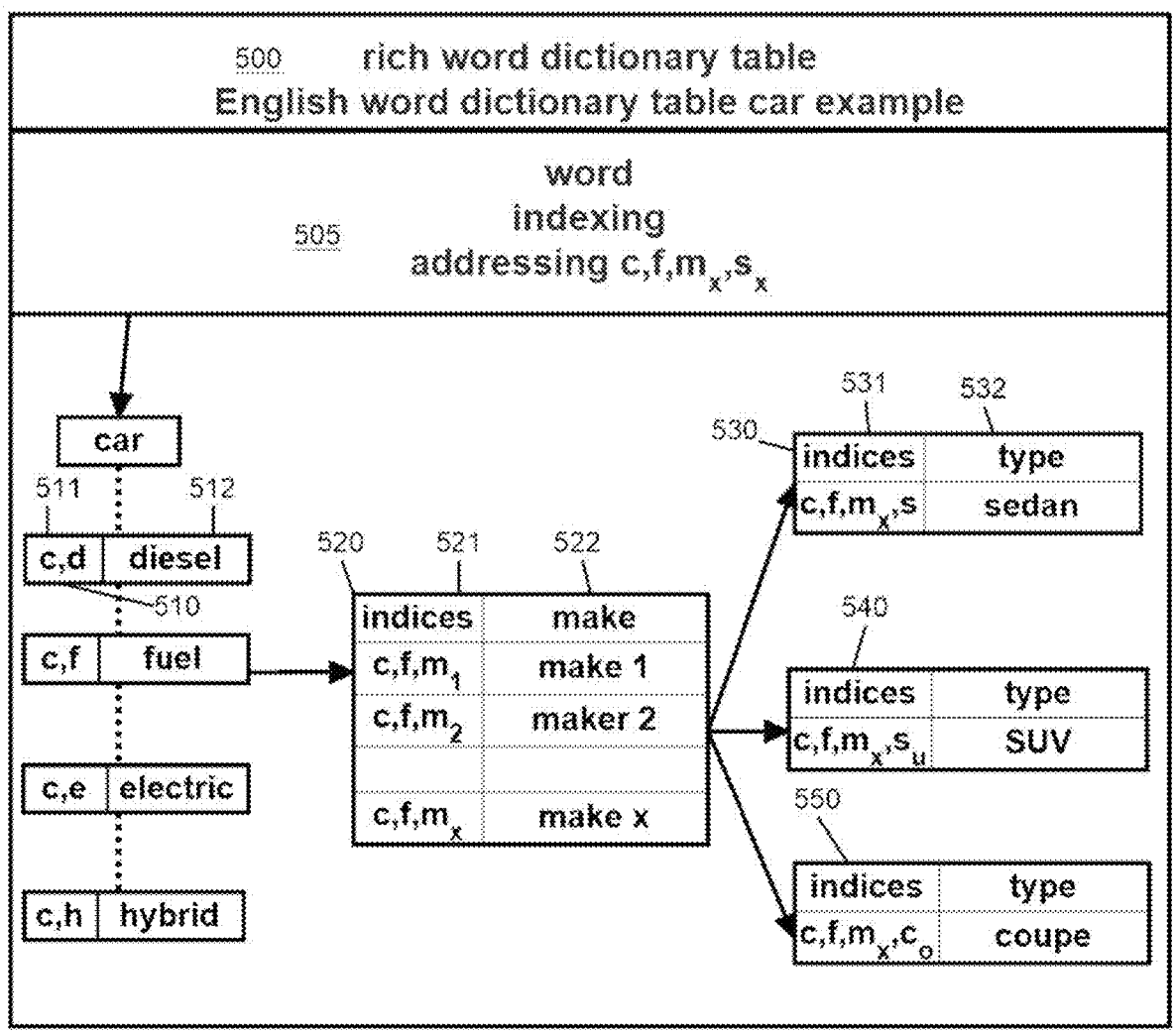
FIG. 5A shows an example on how in the English rich word dictionary for the word automotive with the first three levels, matrices element indices are implemented.
Figure 5B:
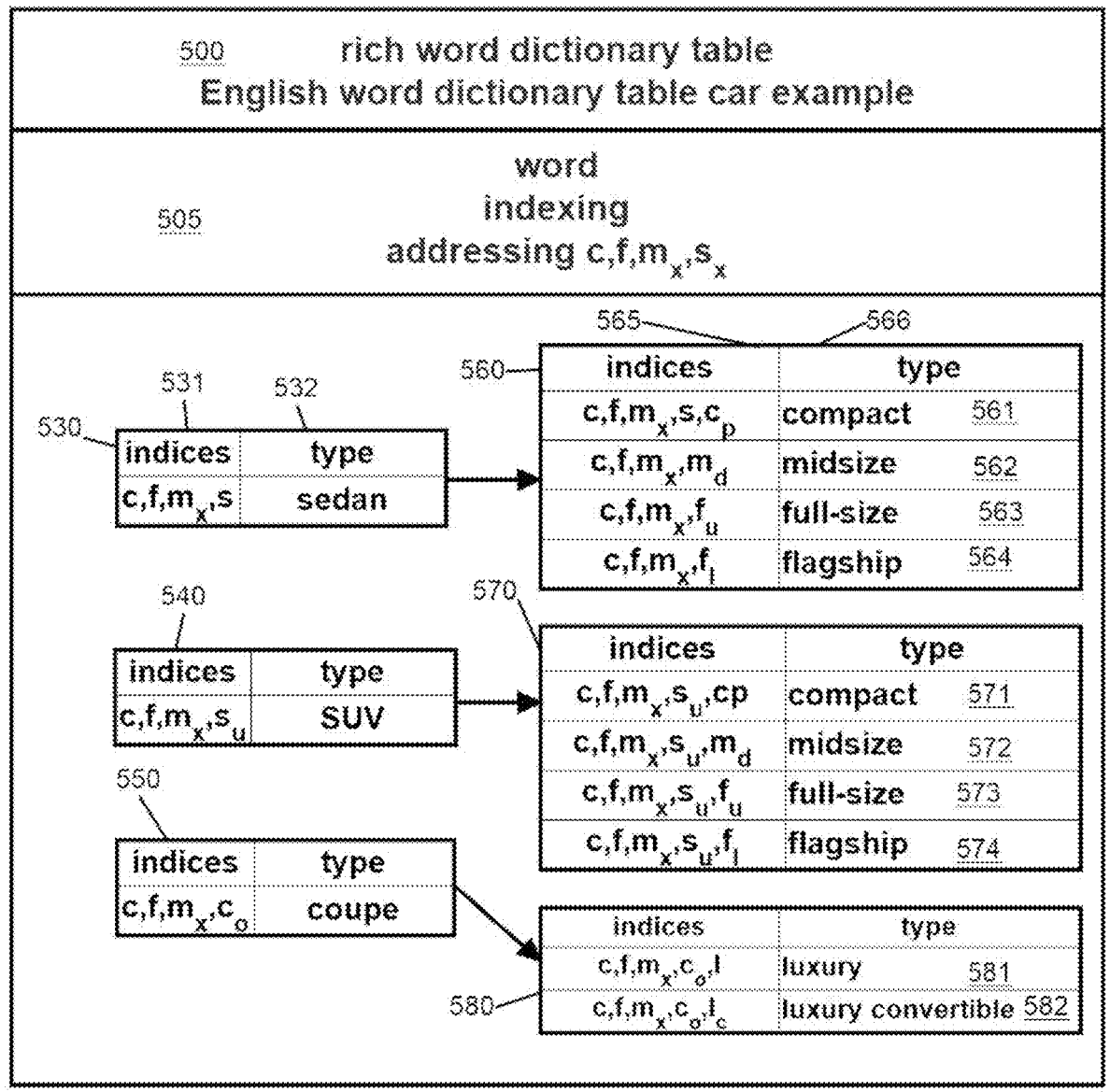
FIG. 5B shows an example on how in the English rich word dictionary for the word automotive with the next fourth level, matrices element indices are implemented
Figure 6:
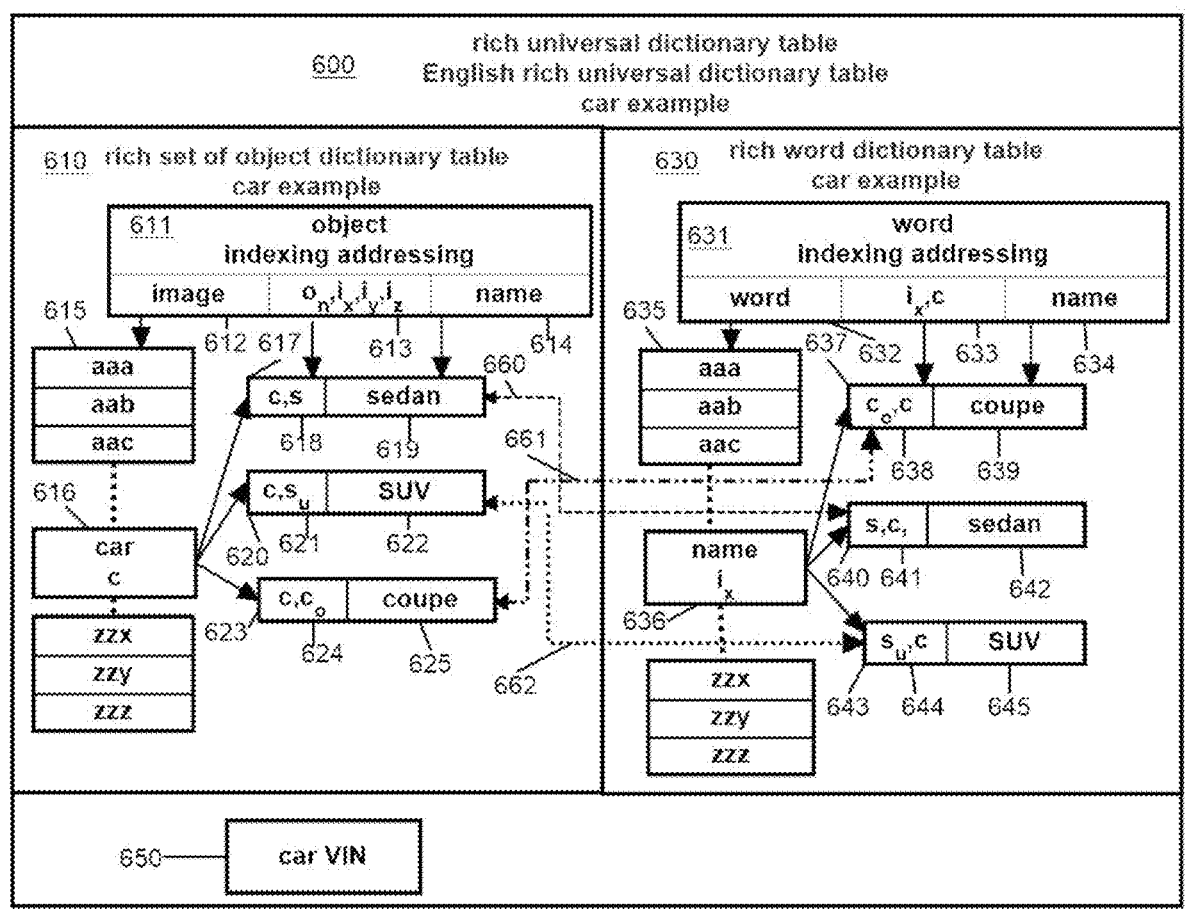
FIG. 6 shows in the time-based universal processor module the relationship between the rich universal dictionary with the rich word dictionary.

The method creates a rich universal dictionary table (see FIGS. 1A, 1B and 1C) formatted as matrices element indices by associating and interlinking a rich word dictionary table formatted as matrices element indices using the word matrices element indices independent of a language to a rich set of object table formatted as matrices element indices using the object matrices element indices independent of a language (see FIGS. 5A, 5B and 6).

A rich word dictionary includes (see U.S. Pat. No. 20110202512A1) for each language by combining specific dictionaries databases into tables formatted as matrix elements indices with identical indices independent of a language. These tables include scaled ranking indices of information formatted as matrices element indices, such as moment in time (verb tense and word usage), priority and sentiment and formatted as matrix elements indices. And where for time scaling, verb conjugation, priority scaling concept, sentiment comparative and superlative scaling scheme concept the weighted and ranking element indices are implemented identical though all languages; using numbers, real number, decimal number, integer and mathematical sets with objects that are distinct, allowing logic operations (see U.S. Pat. No. 20170286398A1).

The rich set of object dictionary table is created, including a set of human biometric data, a set of picture, silhouette and typical model for human, and many objects formatted as matrices element indices identical through all languages. Several field and category such as, automotive, security, military, medical classification are formatted as matrices element indices (see FIG. 1B). Each category has some specific mandatories or rules to follow formatted as matrices element indices, and requiring, the complete contextual description and interpretation of constraint for each category indices and priorities scaling formatted as matrices element indices. The rich set of object dictionary table from its relationship to the rich word dictionary table matrices element indices creates the object matrices element indices with the corresponding word matrices element indices. The interlinked relation between the rich word dictionary table and the rich set of object table in the rich universal dictionary table (see FIGS. 5A, 5B and 6) integrates the scaling scheme from the rich word dictionary in the rich set of object table and consequently in the rich universal dictionary.

Figure 1A:
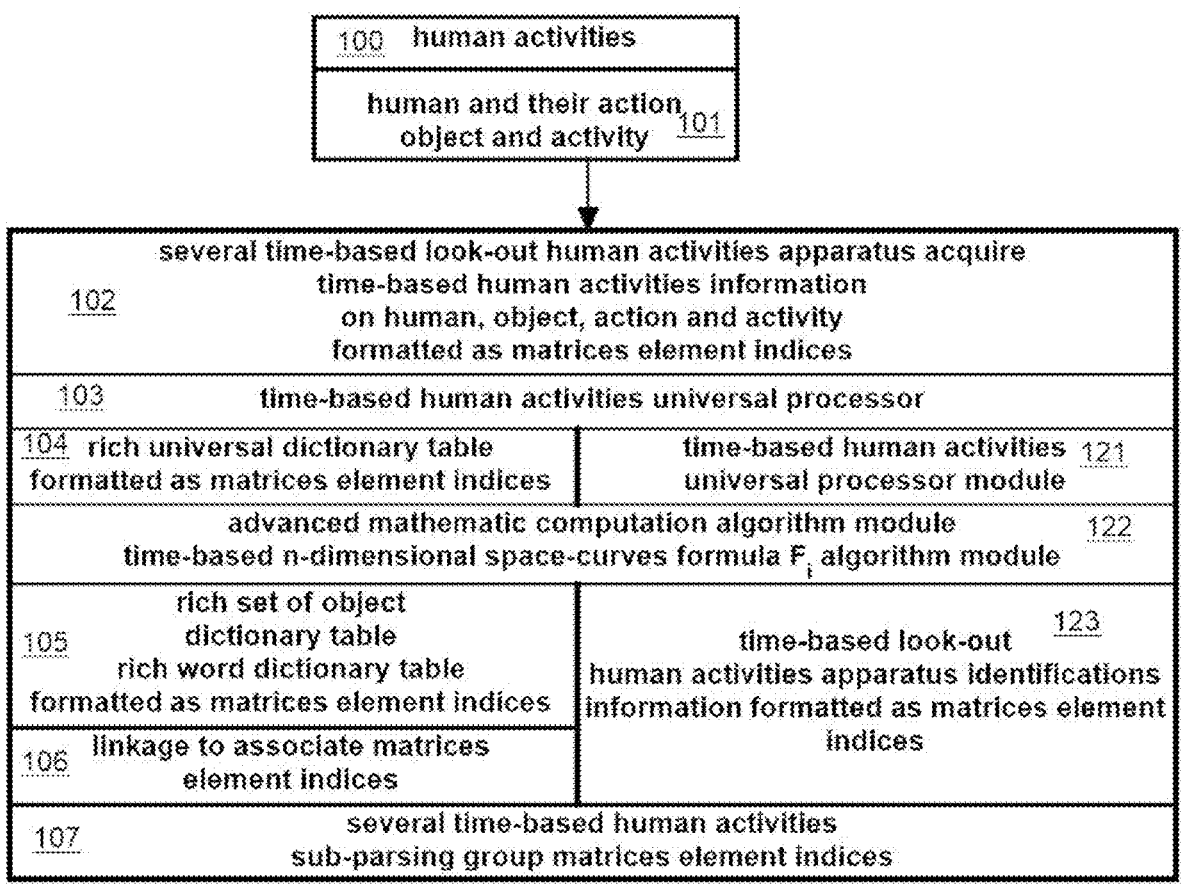
FIG. 1A shows a block diagram how one embodiment of the method is implemented to monitor human activities.

The method is implemented with the time-based human activities universal processor module (see FIGS. 1A and 5B). This module is divided in two independent modules, a rich universal dictionary table module and a processor module. These two modules have interlinked relationship in the time-based human activities universal processor. The rich universal dictionary table is divided in two modules, a rich word dictionary table and a rich set of object dictionary table. These two modules have interlinked relationship (see FIGS. 1A and 1B). The processor module is divided in two modules, a logic and contextual analysis module and an artificial intelligence neural network module. The method when processing defines ambiguity as ambiguous object, ambiguous animal, ambiguous motion, ambiguous activity, ambiguous gesture, ambiguous behavior, ambiguous interaction between human and object, non-classable activities and any classable objects. The artificial intelligence analysis in combination with logic and contextual analysis processes iteratively with relationship to the rich universal dictionary formatted as matrices element indices. To limit wasting computing processing time, if ambiguity is solved only by using the logic and contextual analysis, the artificial intelligence analysis step is bypassed. If the ambiguity remains unsolved, the artificial intelligence neural network module after information formatted as matrices element indices, already gather are appended, is implemented to solve ambiguity.

The method with an object oriented-design architecture simplifies many objectives, such as processing information with their matrices element indices by using these matrix element indices as input information, inter-language relationship, with advanced mathematic computation algorithm, and between object and word direct relationship, time-based n-dimensional space-curves formula $F_i$ algorithm computation and least squares estimation of non-linear parameters algorithm reducing time to compute.

The method creates the time-based look-out human activities apparatus. This apparatus is divided in two sub-apparatus: A sub-apparatus includes video camera with also night vision and thermal vision, microphone, GPS, wireless, RF-ID detector, dedicated to acquiring all human activities as object time-based information formatted as matrices element indices, such as human activities time-based-pictures, standard or accelerated monitoring frame speeds, therefore capturing and defining a delta-time information formatted as matrices element indices, for human and object position, motion, behavior and activities. Being, more information than a human will observe and process. And a sub-apparatus with the capability to communicate in a LAN/WAN, includes a LAN/WAN transmitter and receiver apparatus, with wireless, with Wi-Fi, Wi-Fi max, RF-ID based wireless transponder ability to recognize from passive RF-ID tag to active RF-ID with a nano-battery and an antenna able to receive and to emit.

The method using the time-based human activities universal processor analyzes the set of objects database information formatted as matrices element indices of the time-based human activities, acquire by the monitoring of the human activities by the time-based look-out human activities apparatus. The activities are indoor and outdoor gathering of people, mass meeting rally, people working, kids playing, and many every day activities such as automotive driving; the human being civilian, sportive, military. The time-based human activities investigation associates the humans to their biometric data, animals, task load information formatted as matrices element indices, and objects with their interaction, gesture, related motion and behavior with time. The method identifies and classifies time-based human activities, objects, gestures, activities, behavior and interaction with related motion by means of time-based and delta-time information formatted as matrices element indices to be used as input to be processed. These object information element indices are used to populate the time-based look-out human activities information formatted as matrices element indices.

When monitoring human activities with several time-based look-out human activities apparatus, for each time-based look-out human activities apparatus creating sub-activities time-based information matrices element indices and by aggregating all (or some) time-based human activities information formatted as matrices element indices, to generate and to populate the time-based human activities corresponding group formatted as matrices element matrices indices.

The time-based human activities corresponding group formatted as matrices element matrices indices are analyzed using the time-based human activities universal processor, the method identifies several time-based human activities sub-parsing groups, and using the contextual and ranking module, by gathering all (or some) time-based human activities sub-parsing groups matrices element indices to generate time-based human activities correlation n-dimensional tensors with its element indices and the time-based human activities contextual ranking. And to extract time-based, escalating risk concept, time-based escalating priority concept, time-based anomalous understanding, time-based ranking information formatted as matrices element indices, and action to take and identifying time-based anomalous behavior.

From the time-based objects information database, using the time-based human activities universal processor with the time-based n-dimensional space-curves formula $F_i$ algorithm, permitting with the object monitoring motion, position and behavior to calculate, the object position or projected position. see Table 1:

TABLE 1

| | object based-time $J_{ti}$ | | | |
|---|---|---|---|---|
| | $J_{t1}$ | $J_{t2}$ | $J_{t3}$ | $J_{t4}$ |
| | space-curves segment | | space-curves segment | |
| object position $P_i(x_i, y_i, z_i)$ | $P_1(x_1, y_1, z_1)$ | $P_2(x_2, y_2, z_2)$ | $P_3(x_3, y_3, z_3)$ | $P_4(x_4, y_4, z_4)$ |
| curve length $L_{i,j}$ | n1 time-based frame length $\delta l_{1i}$ $L_{12} = \Sigma_{i=1}^{n1} \delta l_{1i}$ from $P_1$ to $P_2$ | | n3 time-based frame length $\delta l_{3i}$ $L_{34} = \Sigma_{i=1}^{n3} \delta l_{3i}$ from $P_3$ to $P_4$ | |
| delta time $\Delta t_{i1, in}$ | $\Delta t_{12}$ = time from $J_{t1}$ to $J_{t2}$ | | $\Delta t_{34}$ = time from $J_{t3}$ to $J_{t4}$ | |
| calculated speed $S_{i1, in}$ | from $P_1(x_1, y_1, z_1)$ to $P_2(x_2, y_2, z_2)$ $L_{12}$ divided by $\Delta t_{12}$ calculates speed $S_{12}$ | | from $P_3(x_3, y_3, z_3)$ to $P_4(x_4, y_4, z_4)$ $L_{34}$ divided by $\Delta t_{34}$ calculates speed $S_{34}$ | |
| calculated $Y_{i1, in}$ | speed $S_{12}$ compared to speed $S_{34}$ to estimate and to calculate from $P_1(x_1, y_1, z_1)$ to $P_4(x_4, y_4, z_4)$ an acceleration or deceleration $Y_{14}$ | | | |

In this table 1 an object with position $P_1(x_1, y_1, z_1)$ and a based-time $J_{t1}$ is moving to position $P_2(x_2, y_2, z_2)$ with a based-time $J_{t2}$. This object moves the space-curves segment length $L_{12}$ in a delta time $\Delta t_{12}$. The exact distance $L_{12}$ is calculated from many 1 to n time-video frame (or other time-based apparatus) distance information formatted as matrices element indices acquired between object image length step $\delta l_{1i}$ being linear, plane, ascensional and rotation motion from $P_1$ to $P_2$ as $\delta l_{1i}$ to $\delta l_{1n1}$. The time-based n-dimensional space-curves formula $F_i(p_{i1}, p_{i2},$ to $p_{in}, r_{\Theta\alpha i1}, r_{\Theta\alpha i2},$ to $r_{\Theta\alpha in}, r_{\Theta\beta i1}, r_{\Theta\beta i2},$ to $r_{\Theta\beta in}, r_{\Theta\gamma i1}, r_{\Theta\gamma i2},$ to $r_{\Theta\gamma in}, ax_i, by_i, cz_i, dt_i)$, compiles the $\delta l_{1i}$ to $\delta l_{1n}$ of the object moving on the space curves and calculates the exact distance $L_{12}$. The average speed information $S_{12}$ formatted as matrices element indices between $P_1$ to $P_2$ is obtained by dividing $L_{12}$ by $\Delta t_{12}$.

This object with position $P_3(x_3, y_3, z_3)$ and a based-time $J_{t3}$ is moving to position $P_4(x_4, y_4, z_4)$ with a based-time $J_{t4}$. This object moves the space-curves segment length $L_{34}$ in a delta time $\Delta t_{34}$. The exact distance $L_{34}$ is calculated from many 1 to n time-video frame (or other time-based apparatus) distance information formatted as matrices element indices acquired between object image length step $\delta l_{3i}$ being linear, plane, ascensional and rotation motion from $P_1$ to $P_2$ as $\delta l_{3i}$ to $\delta l_{3n3}$. The time-based n-dimensional space-curves formula $F_i(p_{i1}, p_{i2},$ to $p_{in}, r_{\Theta\alpha i1}, r_{\Theta\alpha i2},$ to $r_{\Theta\alpha in}, r_{\Theta\beta i1}, r_{\beta i2},$ to $r_{\Theta\beta in}, r_{\Theta\gamma i1}, r_{\Theta\gamma i2},$ to $r_{\Theta\gamma in}, ax_i, by_i, cz_i, dt_i)$, compiles the $\delta l_{3i}$ to $\delta l_{3n3}$ of the object moving on the space curves and calculates the exact distance $L_{34}$. The average speed information $S_{34}$ formatted as matrices element indices between $P_3$ to $P_4$ is obtained by dividing $L_{34}$ by $\Delta t_{34}$.

The method from the object average speed over two space-curves length segment speed information, by correlating the time-based object speed information $S_{12}$ formatted as matrices element indices to the time-based object speed information $S_{34}$ formatted as matrices element indices calculates and estimates the object acceleration or deceleration information $\gamma_{14}$ formatted as matrices element indices between moving from one space-curves segment to the other space-curves segment.

For automotive the method processes the relationship between automotive using the time-based human activities universal processor dedicated to automotive (see FIG. 4A) as a module. This module is loaded on each automotive apparatus such as on-board computer or any device, in car, truck and vehicles. Each automotive is fitted with its automotive time-based identification formatted as matrices element indices independent of a language, therefore identical within the rich set of object dictionary to be recognized by other automotive, vehicle, and not limited to. Moreover, with automotive, vehicles, bicycle, pedestrian, road signal, and any information panel are also fitted with a user time-based identification with matrices element indices. Each automotive is fitted with a time-based look-out human activities apparatus to acquire the time-based information identification matrices element indices for road, traffic, others vehicles, pedestrians, storing these information formatted as matrices element indices, on a time-based temporary database within the rich set of object dictionary. This time-based look-out human activities apparatus serves also to receive others time-based vehicle request for its automotive identification and to broadcast its own automotive identification formatted as matrices element indices. As described, for an automotive the time-based look-out human activities apparatus and the automotive identification are at the highest status able to acquire, to receive, to broadcast, to be identified and to store information. In many application this time based look-out human activities apparatus and or the user identification depends of the requirement and the capability of the apparatus, as example, with for a handheld device the same capability, with for pedestrian, bicycle, road signal with only the capability to receive, to broadcast and to store or for pedestrian a chip with the lowest status being only the capability to store a user identification formatted as matrices element indices and to be identified and all in-between configuration.

In the rich universal dictionary table matrices element indices module, (see FIG. 1B) are appended some specific rule to follow such as automotive make and brand, driving code, driver license and insurance information, traffic rule for several driving situation city, highway, motorway, rain; snow; storage temporary information tables acquired by apparatus such as GPS, video camera, night vision camera, radar, LED and RF-ID (or other wireless transmitter), road signal, traffic information, speed and others automotive nearby, others vehicles and pedestrians nearby formatted as matrices element indices. In the artificial intelligence neural network module several appending may be implemented, such as driving on rain, driving on snow, driving on ice and many others driving conditions.

And on each automotive, an automotive time based information exchange module is installed on an apparatus such as an on-board computer, to interact as input, to correlate and to rank all acquire and receive time-based information formatted as matrices element indices, for each automotive, vehicle, pedestrian and many others objects.

The method implements direct time-based information exchange without requiring a centralize computing center (such as cloud or GPS location time-based information exchange). To generate using the time-based human activities universal processor dedicated to automotive the time-based mutual action to take. In the automotive time-based information exchange module, with the already mentioned input from its own vehicle and from vehicles in the acquisition ranges, it is included, complementary data such as itinerary, speed, acceleration, deceleration, along with other in the range vehicles acquired information formatted as matrices element indices, to be processed using the time-based human activities universal processor dedicated to automotive. The time-based human activities universal processor works as a human, but using in the method more time-based information than a human driver will ever have.

To demonstrate the time-based human activities universal processor capability, these applications are presented:

1. In an emergency driving situation to avoid an accident all automotive will undertake matching action such as breaking, changing lane, to avoid a collision.

2. In an emergency driving situation in case of an unavoidable accident, all automotive will undertake matching action; to minimize the impact.

3. When automotive, vehicles, trucks and buses are fitted with an apparatus such as an onboard computer, the time-based look-out apparatus to acquire, to receive to broadcast, to be identified and to store information formatted as matrices element indices, such as road panel, traffic rule, road signal, fitted with a chip or other means to be identified, creates without heavy street; road and highway infrastructure an artificial intelligence autonomous automotive driving environment.

4. When an automotive or other vehicles are not fitted with the method. The automotive or vehicles fitted with the method will used the time-based look-out apparatus to acquire time-based information formatted as matrices element indices, and will exchanging information on the un-fitted object, such as automotive, vehicles, pedestrians, motion and behavior and with the past, present time-based behavior information formatted as matrices element indices, using its time-based n-dimensional space-curves formula $F_i$ algorithm to predict future un-fitted object behavior, and with all these acquired and calculated time-based information exchange, the automotive fitted with the method taking accordingly mutual action.

The method creates a standalone time-based human activities neural computing apparatus by incorporating the time-based human activities universal processor. In the standalone time-based human activities neural computing apparatus along with the time-based look-out apparatus is incorporated a master circuit board with its operating system several software applications to be able to acquire and to store the time-based human activities information formatted as matrices element indices and computing with all application allowing, matrix mathematic, tensors mathematic with matrices element indices and implementing object mathematic conception. To generate and communicate using the time-based human activities universal processor, time-based ranking information formatted as matrices element indices, time-based action to take and time-based object behavior such as human, animal, vehicle. With also storing the apparatus identification as matrices element indices and using the transmitter and receiver apparatus to broadcast when interrogated these apparatus matrices element indices. The time-based look-out human activities apparatus with its transmitter and receiver broadcasting capability, acquires all human activities time-based picture as object information formatted as matrices element indices, action, motion, behavior, task load information formatted as matrices element indices, object, human, animal in the human activities and other machine information formatted as matrices element indices. Those time-based information formatted as matrices element indices, create the time-based human activities information formatted as matrices element indices, as time-based object matrices element indices to be integrated in the analysis to generate the time-based information identification formatted as matrices element indices, to be store in the time-based exchange information module. Then using the time-based human activities universal processor incorporating an artificial intelligence neural network appended for machine to machine analysis (see FIGS. 1A, 4A, 4B, 7A, 10A and 10B) to generate and to extract, the time-based human activities understanding formatted as matrices element indices. This time-based information exchange module, filters, organizes, and correlates all the miscellaneous information formatted as matrices element indices. The method identifies several time-based human activities sub-parsing groups. And, to generate, with the time-based information exchange module by gathering several time-based information formatted as matrices element indices, to create time-based human activities sub-parsing groups formatted as matrices element indices using the contextual and ranking module, several time-based correlation n-dimensional tensor with its element indices. To generate and to communicate the time-based escalating risk concept, time-based escalating priority, time-based anomalous understanding, time-based ranking information formatted as matrices element indices; and time-based action to take formatted as matrices element indices to be understood by another machine.

Then if needed, using a time-based human activities universal processor dedicated to natural language analysis, converting information formatted as matrices element indices to a text and using a text to voice module converting to voice for spoken communication.

Figure 10A:
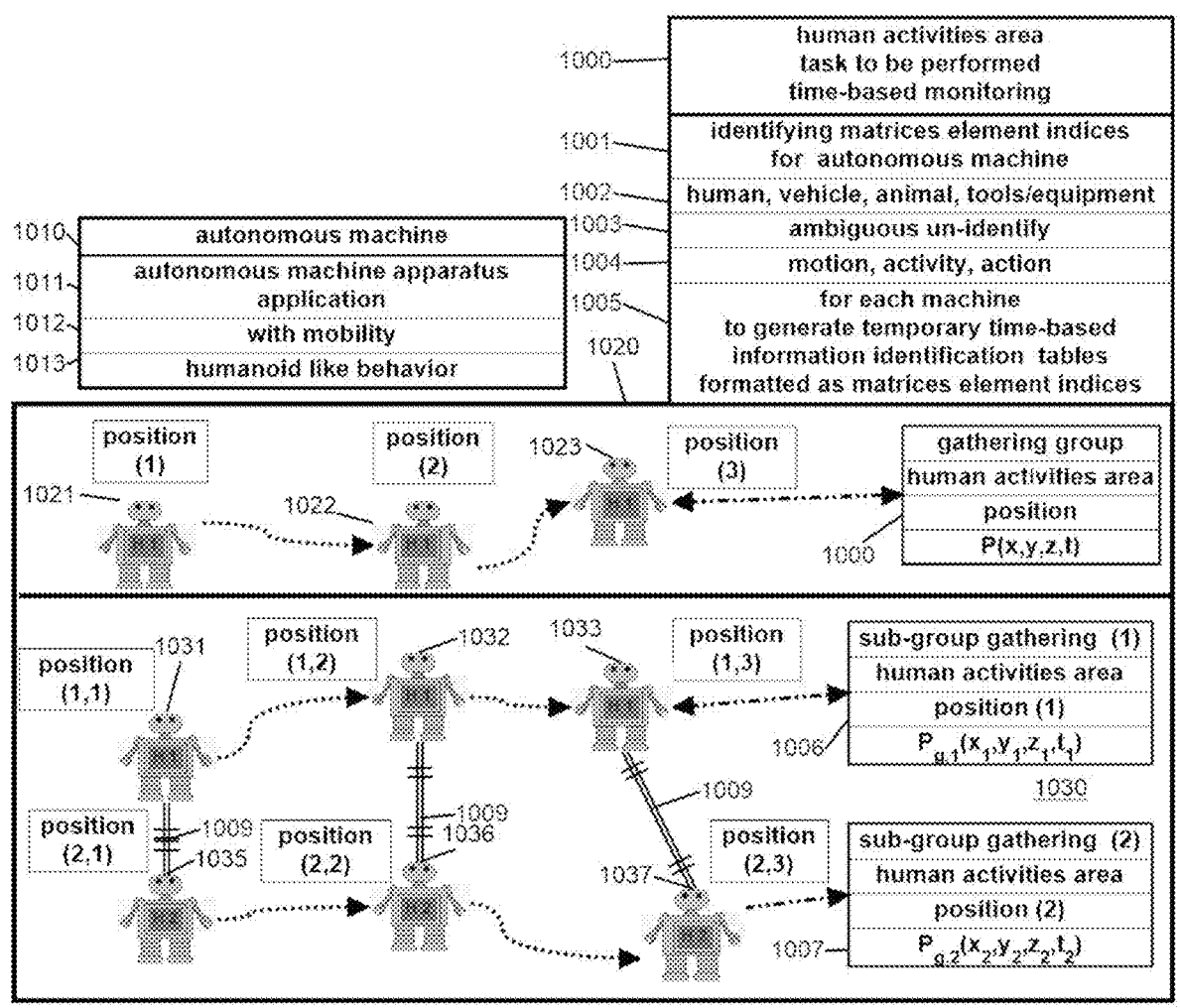
FIG. 10A shows how the method generate the position and motion of objects with an autonomous machine monitoring several human activities sub-groups.
Figure 10B:
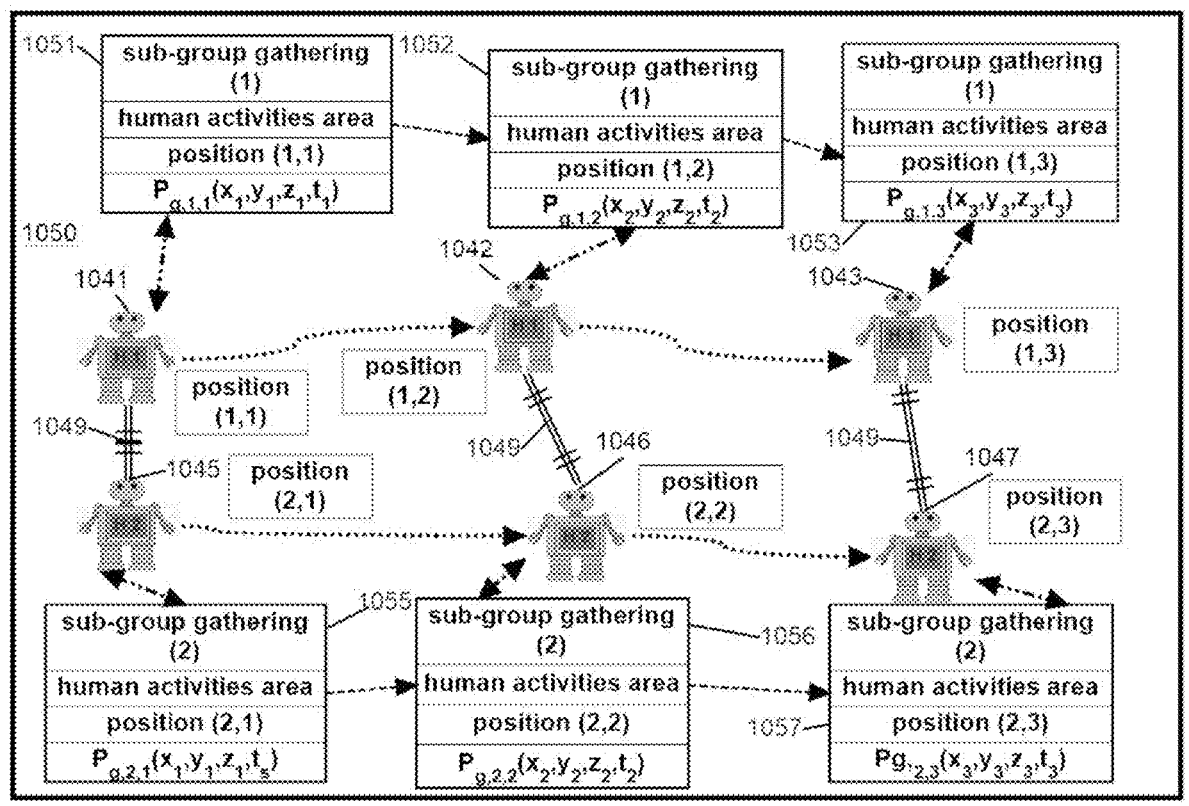
FIG. 10B shows two machines with interlinked relationship monitoring two sub-group gatherings.

The method replaces a human by integrating the standalone time-based neural computing apparatus in a machine (see FIGS. 10A and 10B). The time-based human activities universal processor is installed and run like an application. Each machine having the standalone time-based neural computing apparatus as an application, and with LAN, WAN capability. In the time-based information exchange module, all time-based information formatted as matrices element indices, received from each machine are centralized. Then generating time-based mutual action to take formatted as matrices element indices and if needed as a text.

The method in human activities, investigates and identified time-based object future position, motion, action and behavior using the time-based human activities universal processor with the advanced mathematic computation algorithm and the time-based n-dimensional space-curves formula $F_i(p_{i1}, p_{i2}, \text{to } p_{in}, r_{\Theta\alpha i1}, r_{\Theta\alpha i2}, \text{to } r_{x\alpha in}, r_{\Theta\beta i1}, r_{\beta i2}, \text{to } r_{\Theta\beta in}, r_{\Theta\gamma i1}, r_{\Theta\gamma i2}, \text{to } r_{\Theta\gamma in}, ax_i, by_i, cz_i, dt_i)$ being incorporated by appending both algorithm capabilities to the artificial intelligence neural network.

Figure 9:
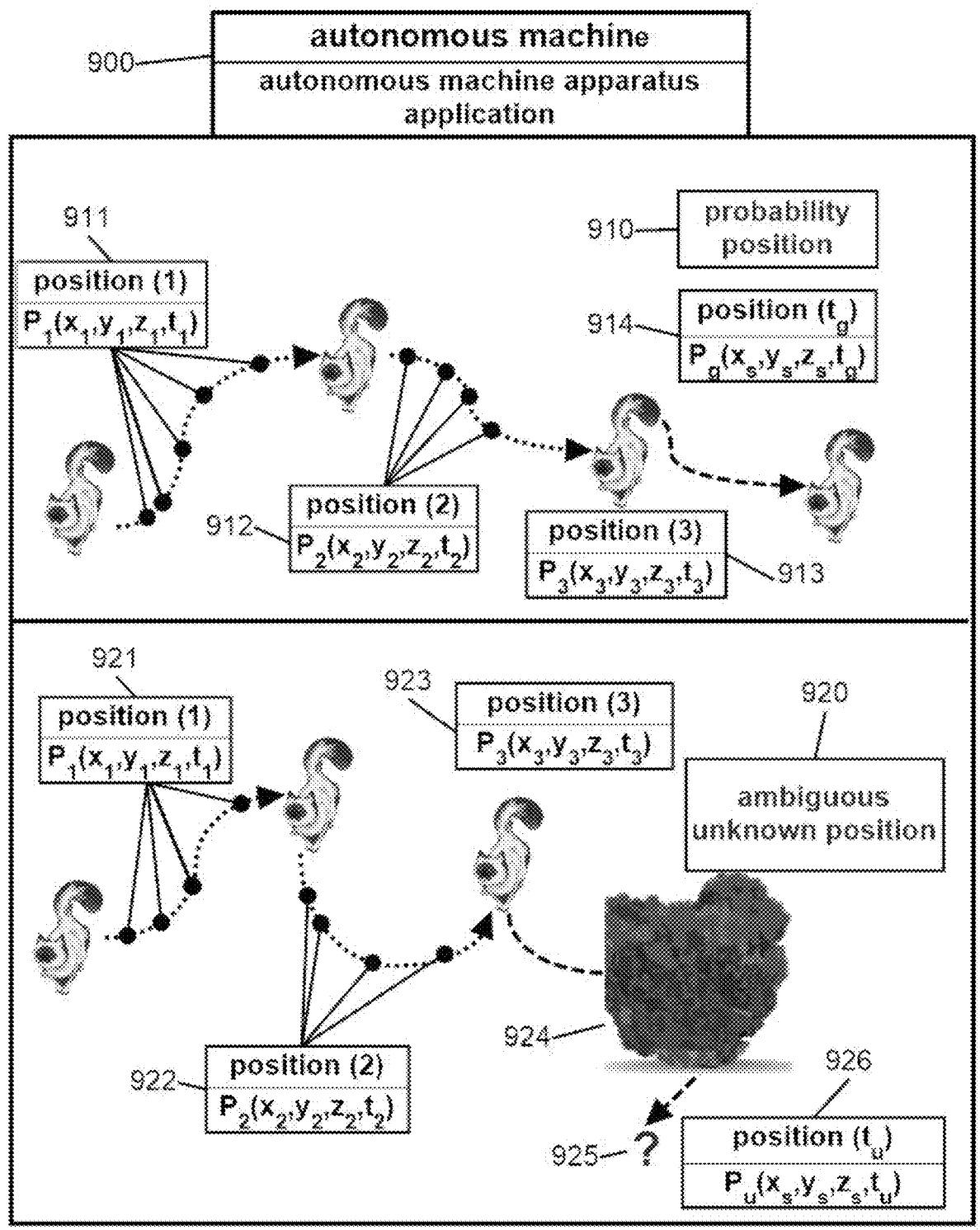
FIG. 9 shows how the method generate the position and motion of an object.

An example on FIG. 9, for motion and tracking an object trail with the time-based human activities universal processor incorporating with its time-based formula $F_i$ algorithm, shows how the parameters are calculated. To simplify this figure, the $F(p_{i1}, p_{i2}, p_{in}, ax_i, by_i, cz_i, dt_i)$ with only showing the relevant parameters linking to motion for a cat (see FIG. 9) selected as an object $O(a, d, c, w)$ with indices respectively "a" an animal, "d" domestic", "c" a cat, "w" white color and position, $P_x(x_x, y_x, z_x, t_x)$ where $x_x, y_x, z_x$ are its relative position while $t_x$ is the time-based. By correlating and comparing two positions using calculus, dividing the distance between these two positions by the time spent going from one position to the next position. And using the scaling ranking scheme within the rich universal dictionary of the time-based human activities universal processor determining that the cat is running; then creating the matrices element indices for this cat O(a, d, c, w, $m_r$) with indices "$m_r$", "m" motion with "r" subscript for running. The method with the time-based human activities universal processor uses an iterative process for determining the $p_{i1}$, $p_{i2}$, $p_{in}$, a, b, c, d parameters of the time-based formula $F_i$ algorithm. These $p_{i1}$, $p_{i2}$, to $p_{in}$, a, b, c, d parameters in the cat's trail formula $F(p_{i1}, p_{i2}, p_{in}, ax_i, by_i, cz_i, dt_i)$ are determined using the first time-based $P_i$ set $P_1(x_1, y_1, z_1, t_1)$ of data, then using the next $P_i$ set $P_2(x_2, y_2, z_2, t_2)$ of data and from these two sets of parameters using the algorithm for least squares estimation of non-linear parameters, to optimize the calculated cat's trail formula to fit the real observed cat's trail. With a new $P_n$: set $P_n(x_n, y_n, z_n, t_n)$ of data the method incorporating this $P_n$ in the iterative process, modify and determine new $p_{i1}$, $p_{i2}$, to $p_{in}$, a, b, c, d parameters.

The method predicting power is shown in FIG. 9. The cat's probable future time-based $t_g$, position is calculated using the time-based human activities universal processor with its time-based formula $F_i(p_{i1}, p_{i2}, p_{in}, ax_i, by_i, cz_i, dt_i)$ algorithm from these last calculated $p_{i1}$, $p_{i2}$, to $p_{in}$, a, b; c; d parameters to position $P_g(x_s, y_s, z_s, t_g)$.

The method predicting power is also shown in FIG. 9 with a simple limited option example. The cat's probable future time-based $t_u$, position is calculated using the time-based processor with its time-based formula $F_i(p_{i1}, p_{i2}, $ to $p_{in}, ax_i, by_i, cz_i, dt_i)$ algorithm with the last calculated $p_{i1}$, $p_{i2}$, to $p_{in}$, a, b; c; d parameters to determine the probable position $P_u(x_s, y_s, z_s, t_u)$. The cat is not showing at this probable position $P_u(x_s, y_s, z_s, t_u)$ and has disappeared. The method identifies this as an ambiguous situation and using the time-based human activities universal processor incorporating a time-based formula $F_i(p_{i1}, p_{i2}, $ to $p_{in}, ax_i, by_i, cz_i, dt_i)$ algorithm and then from the artificial intelligence neural network analysis, to correlate the cat's proposed trail with a tree intersecting this cat's trail, solving this ambiguity with an answer: the cat is in the tree.

The method using an identical process to analyze, investigate and solve similar human activities with the time-based universal processor using its time-based n-dimensional space-curves formula $F_i(p_{i1}, p_{i2}, $ to $p_{in}, ax_i, by_i, cz_i, dt_i)$ algorithm with $ax_i$, $by_i$, $cz_i$, $dt_i$ parameters directly monitoring the activities and $p_{i1}$, $p_{i2}$, to $p_{in}$, parameters linking to the human activities such as:

1. An object such as a human in motion disappearing and predicting its location.
2. A human not discovered to the predicted location and having changes presentation using bio-metric data.

With a similar and identical demonstration, the method determines the parameters for objects present behaviors and to determine future objects behaviors using the time-based human activities universal processor with:

The advanced mathematic computation algorithm and the time-based n-dimensional space-curves formula $F_i(p_{i1}, p_{i2}, $ to $p_{in}, r_{\Theta\alpha i1}, r_{\Theta\alpha i2}, $ to $r_{\Theta\alpha in}, r_{\Theta\beta i1}, r_{\Theta\beta i2}, $ to $r_{\Theta\beta in}, r_{\Theta\gamma i1}, r_{\Theta\gamma i2}, $ to $r_{\Theta\gamma in}, ax_i, by_i, cz_i, dt_i)$ integrating the formula Fi completely describes object motion and behavior by incorporating the notion of rotation with the $r_{\Theta\alpha i1}, r_{\Theta\alpha i2}, $ to $r_{\Theta\alpha in}, r_{\Theta\beta i1}, r_{\beta i2}, $ to $r_{\Theta\beta in}, r_{\Theta\gamma i1}, r_{\Theta\gamma i2}, $ to $r_{\Theta\gamma in}$ parameters linking to motion and behavior rotation.

These parameters are calculated for object situation $x_{i1}$, $x_{i2}$, $x_{i3}$ using the Euler matrix single angle rotation notation matrices element indices. Respectively creating the matrices $R_{\alpha i1}$, $R_{\beta i1}$ and $R_{\gamma i1}$ for each single $\Theta_\alpha$, $\Theta_\beta$ and $\Theta_\gamma$ angle rotation. Then using matrices multiplication to create the matrix $R_{\Theta\alpha i1, \Theta\beta i1, \Theta\gamma i2} = R_{\alpha i1} \cdot R_{\beta i1} \cdot R_{\gamma i1}$ and the $r_{\Theta\alpha i1}, r_{\Theta\alpha i2}, $ to $r_{\Theta\alpha in}, r_{\Theta\beta i1}, r_{\beta i2}, $ to $r_{\Theta\beta in}, r_{\Theta\gamma i1}, r_{\Theta\gamma i2}, $ to $r_{\Theta\gamma in}, ax_i, by_i, cz_i, dt_i$ parameters of formula $F_i$. To monitor and to predict objects behaviors, and object being an object, a human, an animal or a vehicle, such as:

1. Object present and future behavior.
2. Object encountering another object.
3. Object disappearing and being merge in another object.

The method in an autonomous machine with mobility and work capability and equipped with the time-based neural computing apparatus; fitted with time-based information module and a time-based information exchange module creates an independent machine with more time-base information than a human will ever have. Several machines monitor the task load and the thing to do to create for each machine a time-based information report formatted as tensors element indices. And the gathering of all machine time-based information report formatted as tensors element indices in the time-based information exchange module.

Using the time-based human activities universal processor, to create the time-based contextual and ranking module a time-based correlation n-dimensional tensor with its element indices. And to assess the over-all time-based task load, time-based thing to do and to generate the time-based requirements to accomplish the time-based task load and time-based thing to do, distributing the time-based work load among every autonomous machine. The work time-based load distribution among every machine includes timing, accomplishment, scheduling and milestone. The time-based task load accomplishment is monitored, and when it is not meeting the scheduling and the time-based load objectives, being an ambiguous activity classification, and by using the artificial intelligence neural network, to generate modifying the time-based task load distribution and to take any corrective action.

The autonomous machines using the time-based universal processor are replacing humans with the time-based neural computing apparatus to monitor several human activities sub-groups and generate the position and motion of objects (see FIGS. 10A and 10B). The autonomous moving machines monitors a human area activities, identifying for each machine: human, vehicle, animal, tools, equipment, motion, activity, action and any ambiguous objects, motion, activity, behavior and action information formatted as matrices element indices, to generate temporary time-based information identification tables formatted as matrices element indices.

Several examples of the method investigating time-based human activities with artificial intelligence analysis in combination with logic and contextual analysis using advanced mathematic have been presented. These examples demonstrating that the method is at home with any human activities when they are organized as set of objects formatted as matrices element indices where each individual object being identified with matrices element indices.

And using the time-based human activities universal processor dedicated to the human activities to be investigated and having integrated the advanced mathematic computation algorithm and the time-based n-dimensional space-curves formula $F_i$ algorithm computation capabilities also dedicated to the human activities to be investigated: To extract time-based for the human activities, many time-based information formatted as matrices element indices such as escalating risk concept, escalating priority concept, anomalous understanding and action to take. And to monitor and to predict objects behaviors, and object being an object, a human, an animal or a vehicle.

FIG. 1A shows a block diagram how one embodiment of the method is implemented to analyze a human activities 100, a gathering of human, their action and behavior, object and related activity 101. Several time-based look-out human activities apparatus acquire the time-based human activities set of objects database information formatted as matrices element indices, on human, object, action, activity and behavior formatted as matrices element indices 102, to be processed with the time-based human activities universal processor module 103. This module is divided in two independent modules, a rich universal dictionary table formatted as matrices element indices module 104 and a processor module using artificial intelligence analysis in combination with logic and contextual analysis 121 using an advanced mathematic computation algorithm and a time-based n-dimensional space-curves formula $F_i$ algorithm 122. These two modules have interlinked relationship in the time-based human activities universal processor. The architecture presented in this figure is built in the software.

Several time-based look-out apparatus 123 acquires and identified for each apparatus several time-based human activities set of objects database information formatted as matrices element indices 107 to be used as input to be processed. These time-based set of objects database information formatted as matrices element indices, are pictures for human or object with motion activity, action and behavior using matrices element indices. The rich set of object dictionary table to process and fully identify these pictures (objects), motions and activities requires assistance and relationship from the rich word dictionary 105. The linkage 106 generates for each apparatus the time-based matrices element indices and to generate several time-based human activities sub-parsing group matrices element indices 107 to be used as input to be analyzed.

FIG. 1B shows from time-based human activities sub-parsing group formatted as matrices element indices 107 how the artificial intelligence analysis in combination with logic and contextual analysis 124 processes with relationship to the rich universal dictionary table (a combination of rich set of object dictionary table and the rich word dictionary table) formatted as matrices element indices 108. The rich set of object dictionary table includes a set of human biometric indices formatted as matrices element indices 109, a set of picture, silhouette and typical model for human, and many objects formatted as matrices element indices 110. Several example of field/category classification such as, automotive, security, military, medical, machine to machine and human to machine relationship, and not limited are indices independently formatted as matrices element indices 111. Each category has some specific mandatories or rules to follow, an example for automotive, such as driving code, highway rule, traffic rule and not limited, while for security and military they will depend of the agency, corporate rule, or MIL specification and requirement. For each category it includes complete details indices formatted as matrices element indices 112. The complete contextual description and interpretation of constraint for each category indices formatted as matrices element indices 113.

Using the artificial intelligence analysis in combination with logic and contextual analysis of the time-based human activities universal processor 124, the iterative processing using an advanced mathematic computation algorithm and a time-based n-dimensional space-curves formula Fi algorithm is indicated 125. To limit wasting computing processing time, if ambiguity is solved only by using the logic and contextual analysis 126, the artificial intelligence step is bypassed. When the ambiguity remains unsolved 127 the artificial intelligence neural network module is implemented to solve ambiguity 128. Only major steps are shown:

Time-based human activities group (1) is gathering and grouping all time-based human activities sub-parsing group by apparatus and object with their matrices element indices to populate the corresponding time-based human activities groups (1) matrices element indices 129.

Time-based human activities group (2) is by aggregating all, several or some time-based human activities group (1) matrices to generate and to populate time-based human activities group (2) matrices element indices 130.

With gathering all time-based human activities group (2) matrices element indices using advanced mathematic computation algorithm 131 to generate a time-based correlation n-dimensional tensor with its element indices 132.

FIG. 1C shows from the time-based correlation n-dimensional tensor with its element indices 132 how in relationship with each category priorities scaling 114, including several priorities classification scaling indices formatted as matrices element indices 115, using the contextual ranking module with an advanced mathematic computation algorithm and a time-based n-dimensional space-curves formula Fi algorithm 133. To extract as matrices element indices 134, time-based escalating risk concept 135, time-based escalating priority concept 136, time-based anomalous understanding 137, time-based ranking information formatted as matrices element indices, 138 and time-based action to take and extracting time-based behavior 139. The method is not limited to this example; those skilled in the state of the art will recognize that the method is applicable to include in the apparatus voice recognition, and to include in the process a voice to text convertor.

FIG. 2A shows the relationship between matrices and tensors in the method 200. Several 3 by 3 tensors of order 2 (3 by 3 matrices) with same time-based $t_1$, 201, 202 and 203 with layer $j_1$ and element indices e with subscript indices $i_1$, $i_2$, $i_z$ and superscript indices $j_1$, with layer $j_2$ and element indices e with subscript indices $i_1$, $i_2$, $i_z$, $i_t$ and superscript indices $j_2$ and with layer $j_3$ and element indices e with subscript indices and superscript indices $j_3$. Each row respectively row 1, 205, row 2, 206 and row 3, 207 and column respectively column 1, 210, column 2, 211 and column 3, 212 are formatted as matrices element indices.

FIG. 2B shows three tensors time-based $t_1$ with respectively layer $j_1$, 221, layer $j_2$, 222 and layer $j_3$, 223 to create a n-dimensional tensor 220 with superscript indices $j_1, j_2, j_3$ and subscript $i_1$, $i_2$, $i_z$, $t_1$.

Those skill in the state of the art will understand that in this tensor implementation matrices element indices have an identical meaning and representation as tensor element indices.

Those skill in the state of the art will recognize that in the method the matrix mathematic computation is applicable to combination of tensor layers and that for higher n-dimensional tensor uses the tensor mathematic computation when the matrices mathematic computation is not applicable FIG. 3 shows a n-dimensional tensor shows the relationship between matrices and tensors in the method. A n-dimensional tensor 300 with layers subscript indices $j_1, j_2, j_3$, $j_t$ and element indices e with subscript indices $i_1$, $i_2$, $i_z$. This tensor is created with several n minus 1 dimensional tensors, tensor 1 superscript indices $j_1$, $j_t$ and element indices e with subscript indices $i_1$, $i_2$, $i_z$ 301, tensor 2 superscript indices $j_2$, $j_t$ and element indices e with subscript indices $i_1$, $i_2$, $i_z$ 302, tensor 3 superscript indices $j_3$, $j_t$ and element indices e with subscript indices $i_1$, $i_2$, $i_z$ 303.

Those skill in the state of the art will understand that in this tensor implementation matrices element indices have an identical meaning and representation as tensor element indices.

Those skill in the state of the art will recognize that in the method the matrix mathematic computation is applicable to combination of tensor layers and that for higher n-dimensional tensor uses the tensor mathematic computation when the matrices mathematic computation is not applicable.

FIG. 4A shows a block diagram illustrating how the method processes the relationship between automotive while driving. A time-based human activities universal processor module dedicated to automotive is loaded on each automotive/vehicles on-board computer or a specific apparatus. 400. This module is divided in two independent modules, a rich universal dictionary table dedicated to automotive module 401 and an artificial intelligence analysis in combination with logic and contextual analysis module 421. These two modules have interlinked relationship in the time-based human activities universal processor. The automotive is fitted with a time-based look-out human activities apparatus to acquire and to broadcast some information formatted as matrices element indices, 402. In the rich universal dictionary module, are appended the information formatted as matrices element indices, obtain by the time-based look-out apparatus such as road and traffic 403, other vehicle, pedestrian 404 panel traffic light, and others 405 to be stored in a time-based temporary information identification formatted as matrices element indices 406, while for security and transportation they will depend of the agency, or corporate rule. The time-based look-out human activities apparatus to answer and to broadcast request 407 the automotive identification formatted as matrices element indices which was created to be recognized by other automotive. 408, with many information formatted as matrices element indices, on the automotive 409 such as automotive make and type 410, speed with acceleration and deceleration 411, driving movement intent 412, and traffic, vehicle, pedestrian in its range 413 with the automotive identification formatted as matrices element indices 414. The iterative processing is indicated. To limit wasting computing processing time, if ambiguity is solved only by using the logic and contextual analysis module 421, the artificial intelligence step is bypassed 422. Several appending on its artificial intelligence neural network module may be added, such as diving on snow 423, driving on ice 424 and others 425, to create an autonomous vehicles. The many analysis steps are not shown to solve ambiguity to generate 426. The time-based, correlation n-dimensional tensor element indices 427, time-based ranking information formatted as matrices element indices, 428 and time-based action to take 429. All those time-based information formatted as matrices element indices are identified 430 and enter 431 to a time-based temporary database 432. And to be entered in the automotive time-based information exchange module 433.

Figure 4B:
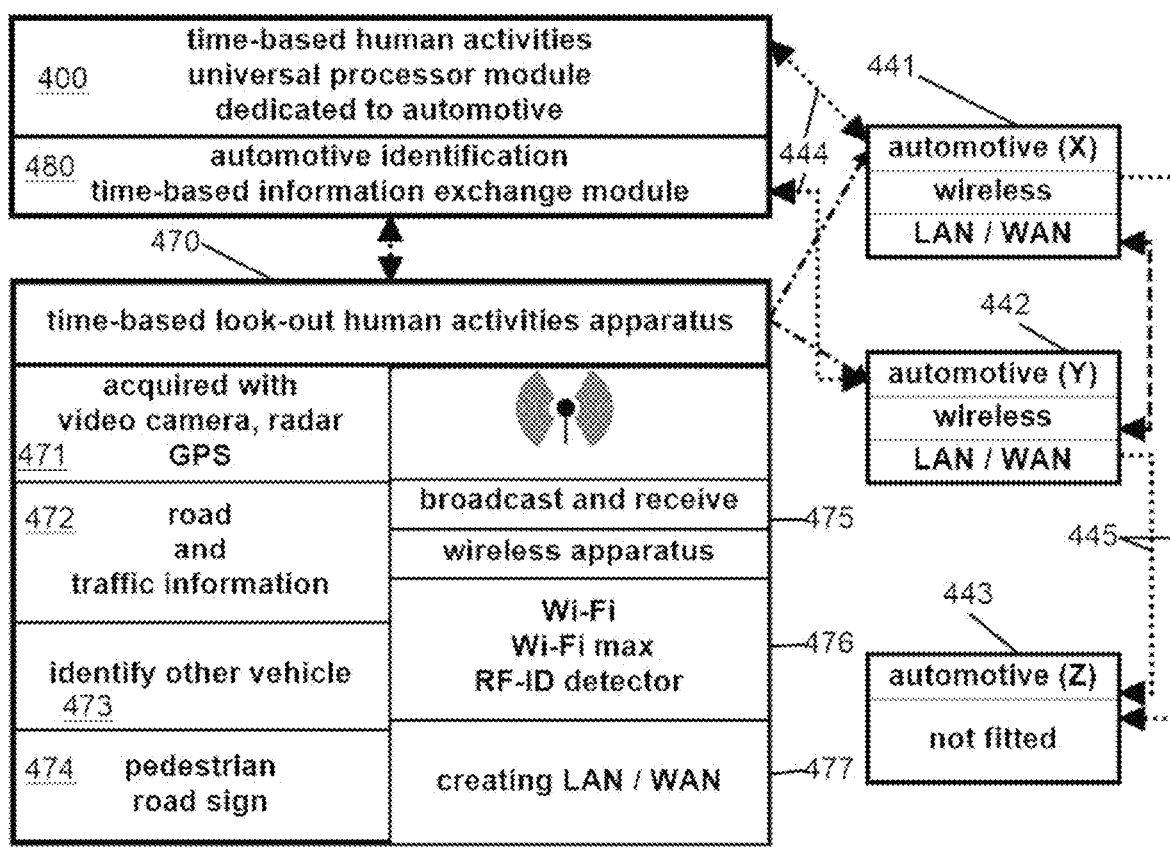
FIG. 4B shows two automotive fitted with the time-based human activities universal processor dedicated to automotive and an automotive information time-base information exchange module.

FIG. 4B shows two automotive fitted 444 with the time-based human activities universal processor dedicated to automotive 400, an automotive information time-base information exchange module 480 and the time-based look-out human activities apparatus 470, respectively automotive (X) 441, automotive (Y) 442. The time-based look-out human activities apparatus is fitted to acquire with video camera, radar and GPS 471 road and traffic information 472, to identify other vehicles 473 and pedestrian and road signal 474. It is also fitted to broadcast and receive 475, using wireless apparatus such as Wi-Fi, Wi-Fi max and RF-ID detector 476 and ability to create and work with LAN/WAN 477. And an automotive (Z) 443 not fitted but monitor by 445 with the time-based look-out human activities apparatus from automotive (X) and (Y).

Figure 4C:
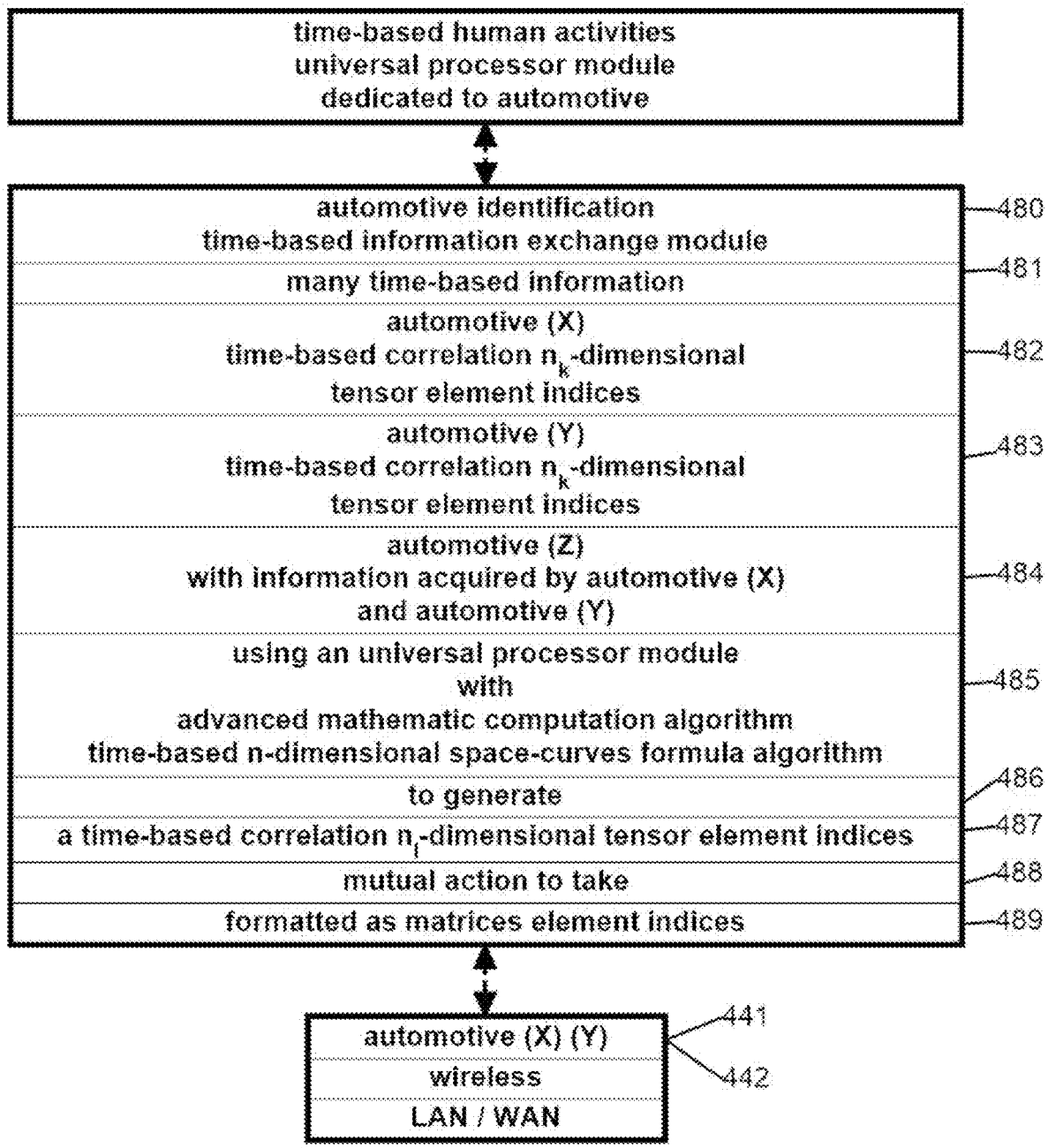
FIG. 4C shows how the automotive (X) and automotive (Y) with an onboard computer (or other apparatus) fitted with a time-based information exchange module process information.

FIG. 4C shows a time-based information exchange module 480 fitted on the automotive (X) 441 and automotive (Y) 442 with an onboard computer (or other apparatus), to interact as time-based input from both the automotive and other automotive, vehicle and pedestrian, the temporary process database, the table information table and ID-table, with all the many information formatted as matrices element indices for each automotive 481. And, in this figure example automotive (X) time-based correlation $n_k$-dimensional tensor element indices 482, automotive (Y) time-based correlation $n_k$-dimensional tensor element indices 483 and automotive (Z) with time-based information formatted as matrices element indices acquired by automotive (X) and automotive (Y) 484 to be analyze using the time-based human activities universal processor dedicated to automotive (see full description 400) with the advanced mathematic computation algorithm and the time-based n-dimensional space-curves formula $F_i(p_{i1}, p_{i2}, \text{to } p_{in}, ax_i, by_i, cz_i, dt_i)$ algorithm 485. To generate 486 a time-based correlation $n_l$-dimensional tensor element indices 487 and time-based mutual action to take 488 formatted as matrices element indices 489.

Those skill in the state of the art will recognize that any object, human and animal not fitted, all automotive will undertake the same time-based information exchange. Those skilled in the state of the art will recognize that automotive will refer to car, truck, bus, SUV, RV, ATV and motor bike.

FIG. 5A shows an example on how the method in the English rich word dictionary table for the word automotive with the first three levels, matrices element indices are implemented 500. The element indices are written as c,f, mx,sx 505. A car 510 is a diesel with indices c,d, a fuel 512 with indices with indices c,f, 511, electric with indices c,e and hybrid with indices c,h. A make indices for a fuel car is appended and shown 520; make (1) 522 with indices c,f,m1, 521 make (2) with indices c,f,m2 and make (3) with indices c,f,m3. A body type 530 is appended to a make, a sedan 531 with indices c,f,mx,s, 532. A body type 540 is appended to a make, a SUV 541 with indices c,f,mx,su, 542. A body type 550 is appended to a make, a coupe 551 with indices c,f,mx,co, 552.

FIG. 5B shows an example on how the method in the English rich word dictionary table for the word automotive with the fourth level, matrices element indices are implemented 500. From the third level: A body type 530 is appended to a make, a sedan 531 with indices c,f,mx,s, 532. A body type 540 is appended to a make, a SUV 541 with indices c,f,mx,su, 542. A body type 550 is appended to a make, a coupe 551 with indices c,f,mx,co, 5520n a sedan 530 is appended, another option 560, respectively with indices 565 and name 566, c,f,mx,s,cp, for a compact, c,f,mx,s,md for a mid-size, c,f,mx,s,fu for a full size and c,f,mx,s,fl for a flagship. On a SUV 540 is appended another option 570, c,f,mx,su,co for a compact, c,f,mx,su,md, for a mid-size, c,f,mx,su,fu, for a full size and c,f,mx,su,fl, for a flagship. On a coupe 550 is appended, another option 580, c,f,mx,co,l for a luxury and c,f,mx,co,lc for a luxury convertible.

Those skill in the state of the art will recognize that the method is not limited to the few indices shown, may be having more classification indices.

Those skilled in the state of the art will recognize that the method is not limited to these car examples but is applicable to many objects.

FIG. 6 shows how the method in the time-based human activities universal processor module the relationship between the rich of object dictionary table with the rich word dictionary table 600 with a car for example 610 and the rich word dictionary table with a car example 630. In the rich set of object dictionary table 610, the object indexing addressing 611 and respectively picture (object) 612, indexing presentation $o_n$, $i_x$, $i_y$, $i_z$, 613 and name 614 is indicated. For car it already exists a VIN database 650, which is interlinked to the database. From the object database 615, some details for object and indices for a car 616 is presented a sedan 617 with respectively indices 618 and name 619, a SUV 620 with respectively indices 621 and name 622 and a coupe 623 with respectively indices 624 and name 625. In the rich word dictionary table 630, the word indexing 631, and respectively word 632, indexing presentation $i_x$, c, $i_y$ 633 and name 634 is indicated. From the word dictionary table 635, some details for word and indices is presented for name (alphabetic order reference) 636, a coupe 637 with respectively indices 638 and name 639, a sedan 640 with respectively indices 641 and name 642, and a SUV 643 with respectively indices 644 and name 645. The sedan indices as an object c,s is liked 660. to the sedan indices as a word s,c. The coupe indices as an object $c,c_o$ is liked 661. to the coupe indices as a word $c_o$,c. The SUV indices as an object $c,s_u$ is liked 662. to the SUV indices as a word $s_u$,c.

Those skill in the state of the art will recognize than the method could be apply to multi-language linkage.

FIG. 7A shows a block diagram illustrating how the method creates a standalone time-based human activities neural computing apparatus 780 incorporating the time-based human activities universal processor module as an application with an advanced computation algorithm and the time-based n-dimensional space-curves formula $F_i(p_{i1}, p_{i2}$, to $p_{in}, ax_i, by_i, cz_i, dt_i)$ algorithm 700. This module is divided into two modules: first, a rich universal dictionary table created by combining a rich set of object dictionary to a rich word dictionary table formatted as matrices element indices module 701 and a second an artificial intelligence analysis in combination with logic and contextual analysis module 720. The method analysis has been described in FIGS. 1A, 1B and 1C, on this figure only the main steps are shown. Using in the rich universal dictionary table the relationship between the rich set of object dictionary table and the word dictionary table (see FIG. 6) to generate the time-based human activities 702 with the relationship between rich set of object dictionary table and the rich word dictionary table 703 time-based human activities set of objects database information matrices element indices 704. To be analyzed by the artificial intelligence analysis with the artificial intelligence neural network incorporating appended for machine to machine analysis, the advanced mathematic algorithm and the time-based n-dimensional space-curves formula $F_i(p_{i1}, p_{i2}$, to $p_{in}, ax_i, by_i, cz_i, dt_i)$ algorithm 721. And with the time-based information exchange module 705 to generate and to extract 722, a time-based human activities understanding 723 formatted as matrices element indices. The method identifies several time-based human activities sub-parsing groups. And, to generate, with the time-based information exchange module 705. This human activities understanding as a machine to machine communication 707 to be further analyzed for a machine to human communication using the time-based human activities universal processor dedicated to natural language analysis 708 converting the machines understanding from matrices element indices to a text. Then using the artificial intelligence analysis in combination with logic (semantic for natural language) and contextual analysis 730 with relationship to the rich word dictionary formatted as matrices element indices module 709. In the artificial neural network as mentioned are appended dedicated to natural language analysis 731 and from word human activities understanding 710 to generate and to communicate a based-time text for human communication 711, using the time-based information exchange module with an advanced mathematic computation algorithm and the time-based n-dimensional space-curves formula $F_i(p_{i1}, p_{i2}$, to $p_{in}, ax_i, by_i, cz_i, dt_i)$ algorithm 705 and the time-based identification apparatus matrices element indices 714, being store in the neural computing apparatus 715 escalating risk concept, escalating priority, anomalous understanding, ranking information formatted as matrices element indices formatted as matrices element indices; and action to take 732, to being stored in the neural computing apparatus 736.

Figure 7B:
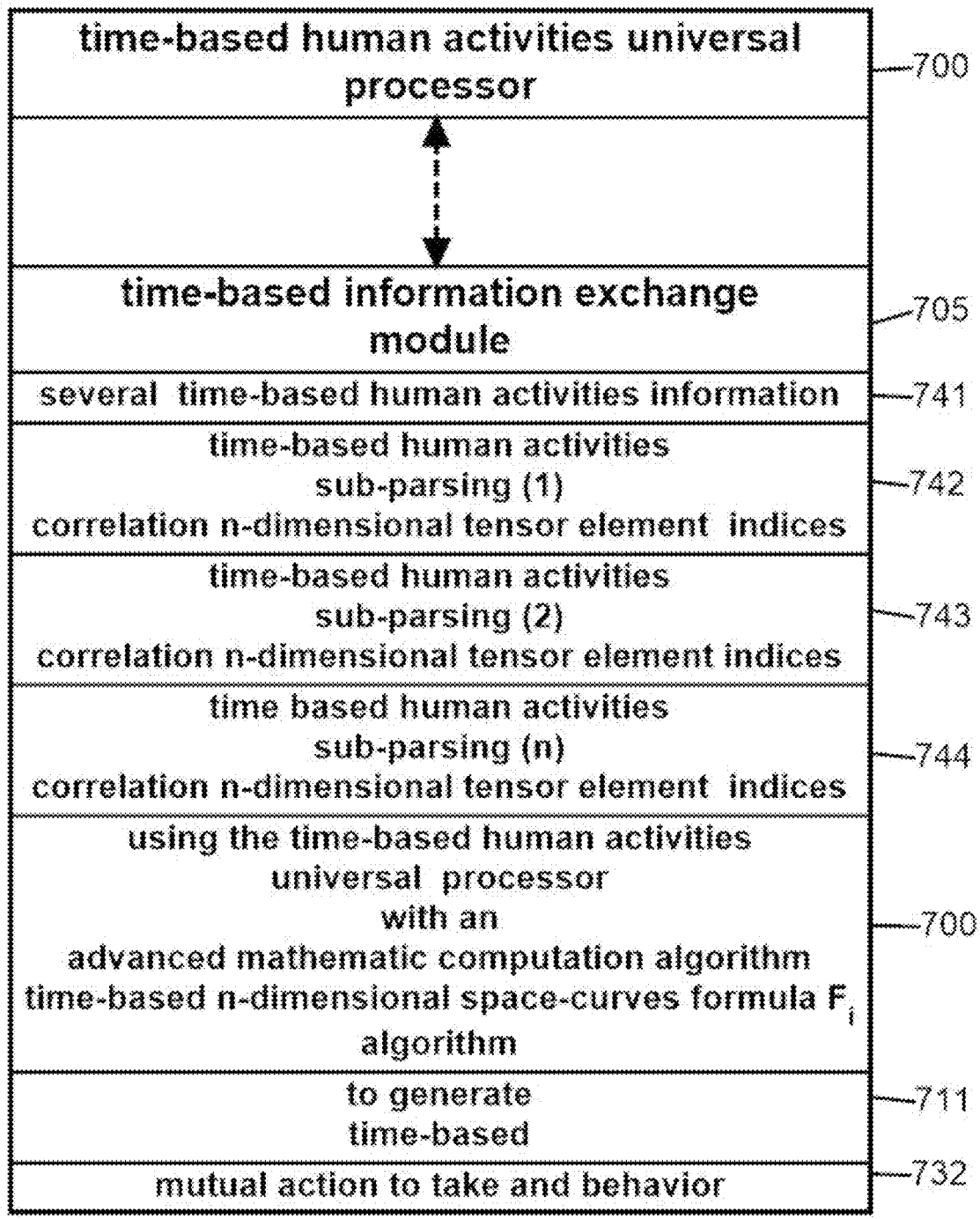
FIG. 7B shows the time-based information exchange module method identifying several time-based human activities group.

FIG. 7B shows how with the time-based information exchange module 705 method identifies several time-based human activities sub-parsing groups by gathering several time-based human-activities set of objects database information formatted as matrices element indices 741 to create time-based human activities sub-parsing groups matrices element indices using the contextual and ranking module several time-based correlation n-dimensional tensor with its element indices for respectively time-based human activities sub-parsing group (1) 742, time-based human activities sub-parsing (2) 743 and time-based human activities sub-parsing (3) 744. And using the time-based human activities universal processor with an advanced computation algorithm and the time-based n-dimensional space-curves formula $F_i(p_{i1}, p_{i2}$, to $p_{in}, ax_i, by_i, cz_i, dt_i)$ algorithm 700 to generate time-based information formatted as matrices element indices 711 mutual action to take formatted as matrices element indices 732.

Figure 7C:
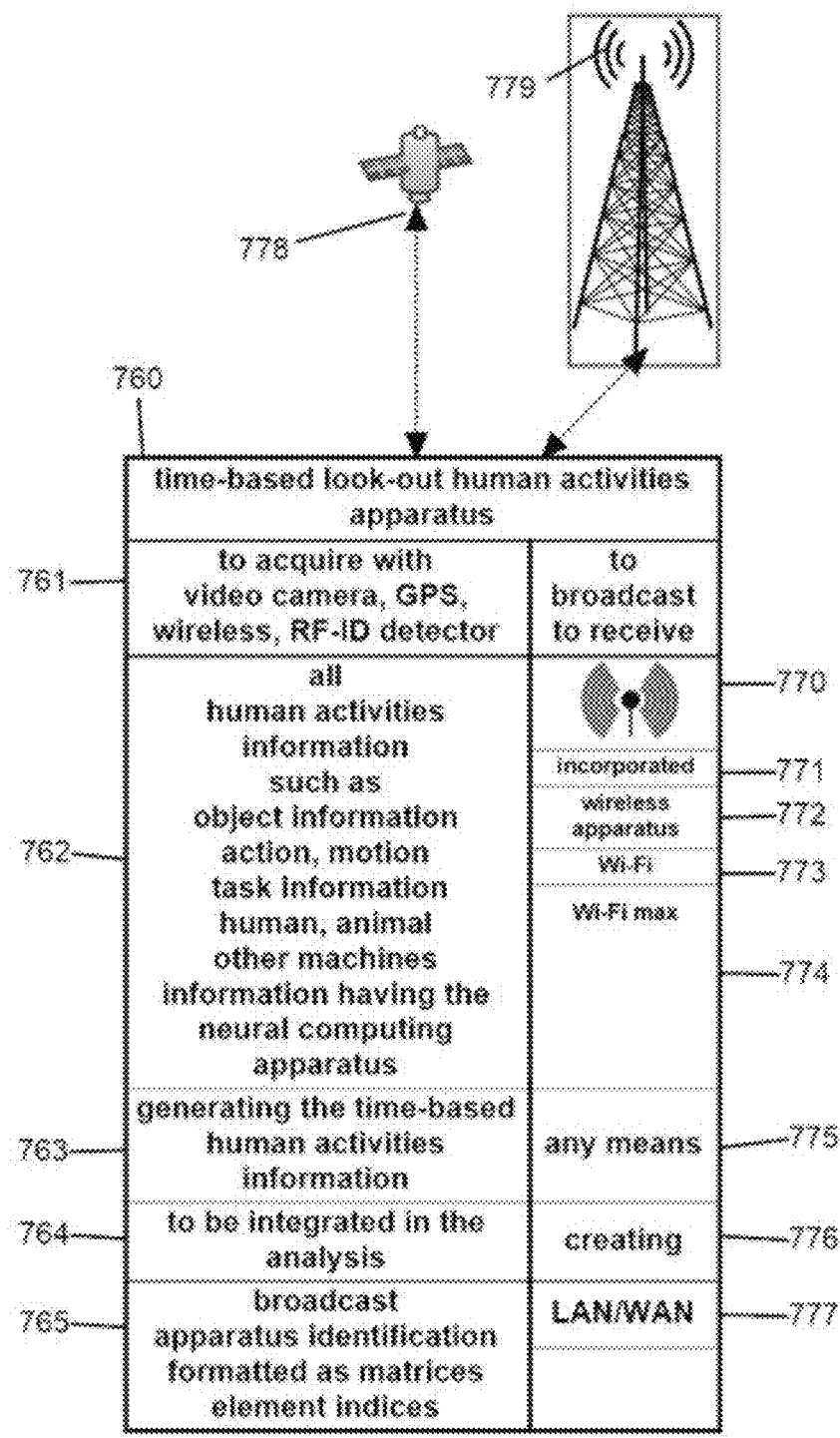
FIG. 7C shows a block diagram illustrating how the method creates a standalone time-based human activities neural computing apparatus.

FIG. 7C shows a block diagram illustrating how the method creates a standalone time-based human activities neural computing apparatus 780 using the time-based look-out human activities apparatus 760, to acquire with video camera including night vision and thermal vision, microphone, GPS, wireless, RF-ID detector 761, all human activities as objects time-based information formatted as matrices element indices, for action, motion, behavior, task load information formatted as matrices element indices, human, animal in the human activities and other machine information formatted as matrices element indices 762. And from those time-based information formatted as matrices element indices generating the time-based human activities set of objects database information formatted as matrices element indices 763 to be integrated in the analysis 764. And to broadcast its apparatus time-based identification formatted as matrices element indices 765. And a transmitter and receiver apparatus 770 is incorporated 771, with wireless 772, with Wi-Fi 773, Wi-Fi max 774, any means 775 such as satellite 778 and wireless communication 779 and creating 776 a LAN/WAN capability 777, And with the capability to broadcast its time-based identification apparatus information formatted as matrices element indices (or and as a text) 765 is incorporated.

Figure 7D:
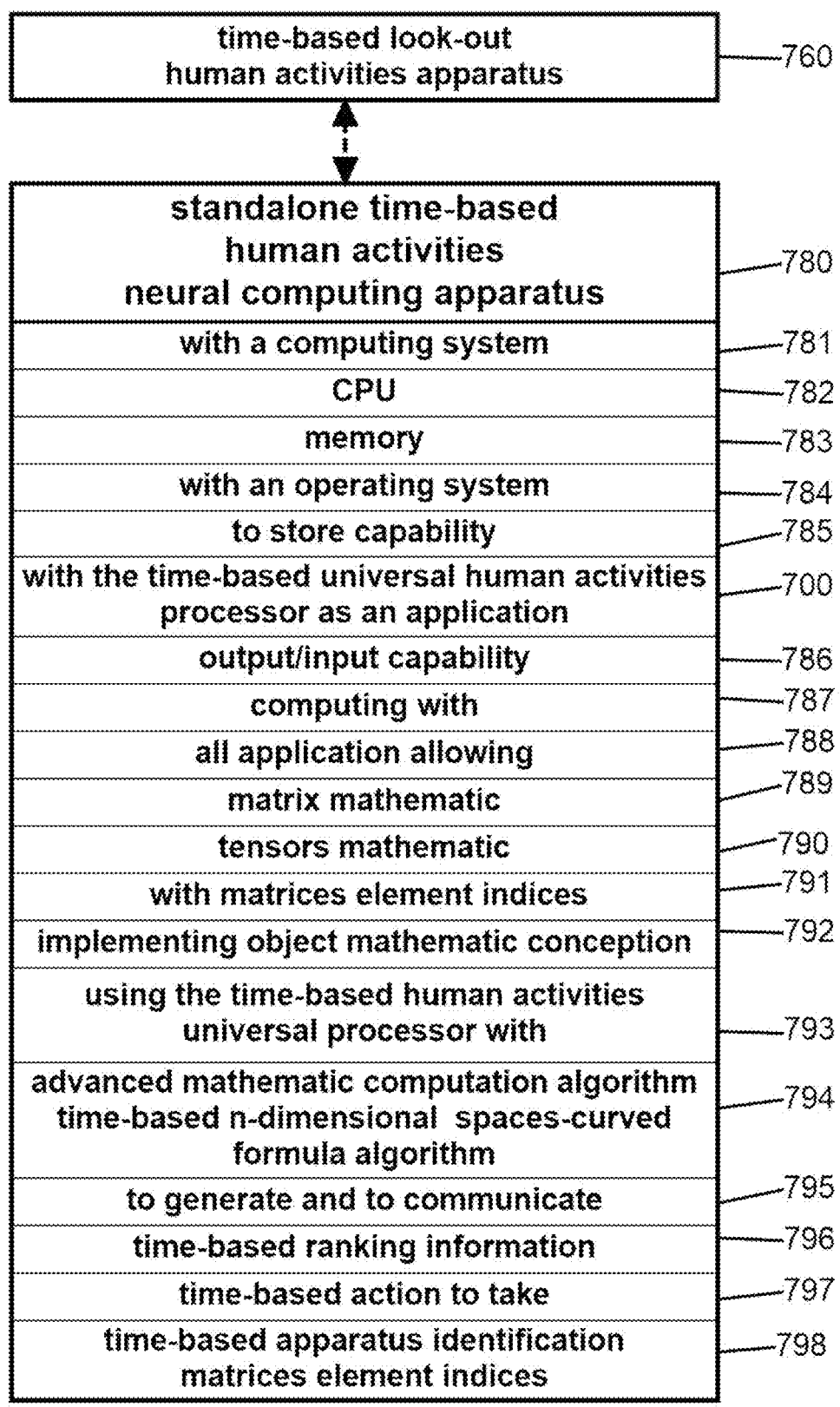
FIG. 7D shows a block diagram illustrating how the method creates a standalone time-based human activities neural computing apparatus.

FIG. 7D show in the standalone time-based human activities neural computing apparatus 780 along with the time-based look-out human activities apparatus 760 with a computing system 781 with a CPU 782. And with memory capability 783, with an operating system 784, to store 785, with the time-based human activities universal processor as an application 700, input/output capability 786, computing with 787, all application allowing 788, matrix mathematic 789, tensors mathematic 790 with matrices element indices 791 and implementing object mathematic conception 792, using the time-based human activities universal processor as an application with 793 the advanced mathematic computation algorithm and the time-based n-dimensional spaces-curved formula algorithm 794, to generate and communicate 795, time-based ranking information formatted as matrices element indices 796, time-based action to take 797 and time-based apparatus identification as matrices element indices 798.

FIG. 8 shows a block diagram illustrating how the method by integrating the standalone time-based human activities neural computing apparatus 800 is used in a machine to replace a human. A description is shown of the standalone time-based neural computing apparatus, module in FIGS. 7A-B-C-D and using the time-based human activities universal processor 810 is implemented with the time-based information exchange module 811 and the time-based look-out human activities apparatus 820. The standalone time-based neural computing apparatus is installed on machine (X), 860, machine (Y) 870 and machine (z) 980. Each machine having the neural computing apparatus 861, and with LAN, WAN capability 862. And a GUI 863 to display application 864, a microphone for voice communication using a voice to text converter application 865 and a speaker using a text to voice converter 866.

FIG. 9 shows how the method using the time-based human activities universal processor to generate the position 900 using the time-based n-dimensional space-curves formula $F_i(p_{i1}, p_{i2}, \text{to } p_{in}, ax_i, by_i, cz_i, dt_i)$ algorithm. The time-based look-out human activities apparatus using the video camera monitoring a white cat identified respectively its motion and positions, several set of data measurements at positions (1) 911 are acquired, with matrices element indices $P_1(x_1, y_1, z_1, t_1)$ where $x_1, y_1, z_1$ are its relative position while $t_1$ is the time-based. To simplify the presentation, only four positions on the cat's trail are indicated, and with a video camera taking 50 frames per second that will represent 50 set of data, and here therefore 300 data set measurement (4+2) before the cat arrives to position (2) 912, with matrices element indices $P_2(x_2, y_2, z_2, t_2)$ where $x_2, y_2, z_2$ are its relative positions while $t_2$ is the time-based, then deriving iteratively the $p_{i1}, p_{12}$, to $p_{in}, ax_i, by_i, cz_i$, using these parameters in the time-based n-dimensional spaces-curves formula $F_i(p_{i1}, p_{i2}, \text{to } p_{in}, ax_i, by_i, cz_i, dt_i)$ algorithm further thoroughly determining these parameters before position (3) 913 with matrices element indices $P_3(x_3, y_3, z_3, t_3)$ where $x_3, y_3, z_3, t_3$ are its relative position while $t_3$ is the time-based, then using these new parameters in the time-based n-dimensional space-curves formula $F_i(p_{i1}, p_{i2}, \text{to } p_{in}, ax_i, by_i, cz_i, dt_i)$ algorithm calculating a probable position 910 for time $t_g$ with a position for time $t_g$ 914 with matrices element indices $P_g(x_s, y_s, z_s, t_g)$. The white cat is monitored to acquire in a similar manner the time-based n-dimensional space-curves formula $F_i(p_{i1}, p_{i2}, \text{to } p_{in}, ax_i, by_i, cz_i, dt_i)$ algorithm parameters between several positions (1) 921 with matrices element indices $P_1(x_1, y_1, z_1, t_1)$ where $x_1, y_1, z_1$ are its relative positions while $t_1$ is the time-based then the cat moves to position (2) 922 with matrices element indices $P_2(x_2, y_2, z_2, t_2)$ where $x_2, y_2, z_2$ are its relative position while $t_2$ is the time-based, then the cat moves to positions (2) 923 with matrices element indices $P_3(x_3, y_3, z_3, t_3)$ where $x_3, y_3, z_3, t_3$ are its relative positions while $t_3$ is the time-based. Then using these parameters in the time-based n-dimensional space-curves formula $F_i(p_{i1}, p_{i2}, \text{to } p_{in}, ax_i, by_i, cz_i, dt_i)$ algorithm calculating a probable 925 position $(t_u)$ with matrices element indices 926 $P_u(x_s, y_s, z_s, t_u)$. The cat is not showing at the probable position and has disappeared. The method identified this as an "ambiguous situation" 920, and by using the artificial intelligence neural network analysis, to solving this ambiguity by proposing a probable answer the cat is in the tree 924.

Those skill of the art will recognize that the method to track, to identify and to extrapolate is applicable to any object, human and animal.

Those skill in the state of the art will recognize that cat position identification is also obtained by camera with thermal vision.

Those skill in the state of the art will recognize that cat position identification is also obtained for a cat fitted with an RF-ID chips.

FIG. 10A shows how the method using the time-based human activities universal processor to generate the time-based position and motion of objects with an autonomous machine monitoring several human activities sub-groups.

The autonomous moving machines monitors a human activities area 1000, identifying matrices element indices 1001, for human, vehicle, animal, tools/equipment 1002, ambiguity un identify 1003, motion, activity, action 1004 for each machine to generate temporary time-based information identification tables formatted as matrices element indices 1005. The autonomous machine 1010 having the autonomous machine apparatus application 1011, with mobility 1012 and a human like behavior 1013. A machine motion is shown 1020 monitoring an entire single gathering group 1000. The machine 1021 with the position (1,1) with matrices element indices $P_{1,1}(x_1, y_1, z_1, t_1)$ move to 1022 position (1,2) with matrices element indices $P_{1,2}(x_2, y_2, z_2, t_2)$ then to 1023 position (1,3) with matrices element indices $P_{1,3}(x_3, y_3, z_3, t_3)$ to generate using the time-based information exchange module with the time-based contextual and ranking module a time-based correlation n-dimensional tensor to extract the time-based human activities understanding and to distribute and to take the time-based collective action. Two machines motions are shown 1030. A sub-group gathering (1) 1006 is monitored by a first machine 1031 with the position (1,1) with matrices element indices $P_{1,1}(x_1, y_1, z_1, t_1)$ then moving to 1032 position (2) with matrices element indices $P_{1,2}(x_2, y_2, z_2, t_2)$ and then to 1036 position (3) with matrices element indices $P_{1,3}(x_3, y_3, z_3, t_3)$. A sub-group gathering (2) 1007 is monitored by a second machine 1035 with the position (2,1) with matrices element indices $P_{2,1}(x_1, y_1, z_1, t_1)$ then moving to 1036 position (2) with matrices element indices $P_{1,2}(x_2, y_2, z_2, t_2)$ and then to 1037 position (3) with matrices element indices $P_{1,3}(x_3, y_3, z_3, t_3)$, the machines interchanging all time-based information formatted as matrices element indices 1009 to generate using the time-based information exchange module with the time-based contextual and ranking module a time-based correlation n-dimensional tensor to extract the time-based human activities understanding and to distribute and to take the time-based collective action.

FIG. 10B shows two machines with interlinked relationship 1049 between a machine (1) to a machine (2) are shown 1050 monitoring two sub-group gatherings; a moving gathering sub-group (1) 1351 at the position (1,1) with matrices element indices $P_{g,1,1}(x_1, y_1, z_1, t_1)$ moves 1052 to position (2) position (1,2) with matrices element indices $P_{g,1,2}(x_2, y_2, z_2, t_2)$ then to 1053 position (1,3) with matrices element indices $P_{g,1,3}(x_3, y_3, z_3, t_3)$ and a moving sub-group gathering (2) 1055 with the position (2,1) with matrices element indices $P_{g,2,1}(x_1, y_1, z_1, t_1)$ moves 1056 to position (2) with matrices element indices $P_{g,2,2}(x_2, y_2, z_2, t_2)$ then 1057 to position (3) with matrices element indices $P_{g,2,3}(x_3, y_3, z_3, t_3)$. A first machine (1) 1041 is monitoring the first gathering sub-group with the position (1,1) with matrices element indices moves to position (1,2) with matrices element indices $P_{1,1,2}(x_2, y_2, z_2, t_2)$ then to position $P(1,3)$ with matrices element indices $P_{1,1,3}(x_3, y_3, z_3, t_3)$. While a second machine (2) 1045 is monitoring the second gathering sub-group with the position (2,1) with matrices element indices moves to position (2,2) with matrices element indices $P_{1,1,2}(x_2, y_2, z_2, t_2)$ then to position $P(2,3)$ with matrices element indices $P_{1,1,3}(x_3, y_3, z_3, t_3)$. The two machine are interchanging all time-based information formatted as matrices element indices 1049 to generate using the time-based information exchange module with the time-based contextual and ranking module a time-based correlation n-dimensional tensor to extract the time-based human activities understanding and to distribute and to take the time-based collective action.

The invention claimed is:

1. A method creating a time-based human activities universal processor; said by integrating artificial intelligence analysis; said in combination with logic and contextual analysis; said performing the artificial intelligence analysis with an artificial intelligence neural network; said with an advanced mathematic computation algorithm capability; said with a time-based n-dimensional space-curves formula $F_i$ algorithm capability.

2. A method to investigate time-based human activities; said with a time-based human activities universal processor; said organizing human activities as set of objects database information formatted as matrices element indices; said identifying each individual object with matrices element indices; said human activities being a gathering of human, animal, object; said with their interaction; said with related motion; said monitoring time-based human activities; said with several time-based look-out human activities apparatus; said using the time-based human activities universal processor; solving ambiguities; said for each apparatus;
creating time-based human activities sub-parsing group formatted as matrices element indices.

3. The method according to claim 2, said by aggregating all (or some) time-based human activities sub-parsing group formatted as matrices element indices;
generating and populating the time-based human activities corresponding group formatted as matrices element indices.

4. The method according to claim 2, from the time-based human activities corresponding group formatted as matrices element indices; said with multi-level correlation classification formatted as tensors element indices;
creating time-based human activities group and sub-group formatted as matrices element indices.

5. The method according to claim 2, from the time-based human activities group and sub-group formatted as matrices element indices; said with a n-plurality of connotation;
creating time-based human activities sub-parsing groups n-dimensional tensors with their element indices.

6. The method according to claim 2, from said gathering all time-based human activities sub-parsing groups n-dimensional tensors with their element indices; said gathering only some time-based human activities sub-parsing groups n-dimensional tensors with their element indices;
identifying several time-based human activities sub-parsing groups; said with their time-based element indices $j_t$.

7. The method according to claim 2, from several time-based human activities sub-parsing groups; said with time-based element indices $j_t$; said with higher correlation comparison and ranking in a n-plurality of connotation; said languages; classification for multi-level correlation;
generating a time-based human activities correlation n-dimensional tensor with its element indices; said with subscript element indices $e=i_1, i_2,$ to $i_n$; said with superscript elements indices $e=j_1, j_2,$ to $j_n, j_t$.

8. The method according to claim 2, from the time-based human activities correlation n-dimensional tensor with its element indices;
generating time-based human activities n-dimensional ranking tensors with their element indices.

9. The method according to claim 2, from the time-based human activities n-dimensional ranking tensors;
creating very sophisticated time-based human activities n-dimensional ranking comparison tensor.

10. The method according to claim 2, from the time-based human activities ranking comparison tensor; said in a form that can be understood by machines and humans;
extracting; said time-based human activities; time-based escalating risk concept; said human activities escalating priority concept; said human activities anomalous understanding; said time-based human activities ranking information formatted as matrices element indices.

11. The method according to claim 2, from the time-based human activities ranking comparison tensor;
extracting action to take; said human and objects motion, behavior; said predicting human and objects future time-based motion, behavior formatted as matrices element indices.

12. A method creating an advanced mathematic computation algorithm; said this algorithm with the human activities organized as a set of objects formatted as matrices element indices; said generating the gathering of all or some object matrices element indices; said using connotation, fields and classifications formatted as matrices element indices; said distributing these objects matrices element indices; said populating several elements of human activities sub-parsing group formatted as matrices element indices; said this algorithm uses matrices calculus; tensors calculus; matrix addition; grouping; multiplication, tensor product; transposition; association; comparing; correlating some or all matrices rows, columns, and layers tensors element indices; said assisting the time-based human activities universal processor;
generating the time-based correlation n-dimensional tensors with element indices.

13. The method according to claim 12, said appending the advanced mathematic computation algorithm to the artificial intelligence neural network; said creating an advanced mathematic computation capability in the artificial intelligence neural network.

14. A method creating a time-based n-dimensional space-curves formula $F_i$ algorithm; said to time-based monitor motion, position and behavior; said with three complementary set of parameters; said the a, b, c, d parameters linking to the object situation x, y, z with time t; said a set of $p_{i1}, p_{i2},$ to $p_{in}$ parameters linking to the monitoring activities; said such as position; motion; behavior; said to the context; security; medical; automotive; military; said to the object; human; animal; vehicle; said to the environment; road; street; parkland; building; said people gathering; said to others rules and conditions; said for each single $\Theta_\alpha, \Theta_\beta$ and $\Theta_\gamma$ angle rotation; said the $r_{\Theta\alpha i1}, r_{\Theta\alpha i2},$ to $r_{\Theta\alpha in}, r_{\Theta\beta i1}, r_{\beta i2},$ to $r_{\Theta\beta in}, r_{\Theta\gamma i1}, r_{\Theta\gamma i2},$ to $r_{\Theta\gamma in}$ parameters; said linking to motion;

behavior; rotation; said for object situation $x_{i1}$, $x_{i2}$, $x_{i3}$; said calculating the clockwise or counterclockwise rotation matrices element indices; said using the Euler matrix single angle rotation notation matrices element indices; said for each single $\Theta_\alpha$, $\Theta_\beta$ and $\Theta_\gamma$ angle rotation; said $r_{\Theta\alpha i1}$, $r_{\Theta\alpha i2}$, to $r_{\Theta\alpha in}$, $r_{\Theta\beta i2}$, $r_{\Theta\beta i2}$, to $r_{\Theta\beta in}$, $r_{\Theta\gamma i1}$, $r_{\Theta\gamma i2}$, to $r_{\Theta\gamma in}$; said for each single $\Theta_\alpha$, $\beta_\beta$ and $\Theta_\gamma$ angle rotation; said creating the matrices $R_{\alpha i1}$; $R_{\beta i1}$; $R_{\gamma i1}$; said $R_{\alpha i1}$ matrices element indices $r_{\alpha i1}$, $r_{\alpha i2}$, to $r_{\alpha in}$; said $R_{\beta i1}$ matrices element indices $r_{\beta i1}$, $r_{\beta i2}$, to $r_{\beta in}$; said $R_{\gamma i1}$ matrices element indices $r_{\gamma i1}$, $r_{\gamma i2}$, to $r_{\gamma in}$; said for the $\Theta_\alpha + \Theta_\beta + \Theta_\gamma$ angles rotations combination; said using matrices multiplication; $R_{\alpha i1} \cdot R_{\beta i1} \cdot R_{\gamma i1}$; said generating matrix $R_{\Theta\alpha i1, \Theta\beta i1, \Theta\gamma i2}$ matrices element indices $r_{\Theta\alpha i1}$, $r_{\Theta\alpha i2}$, to $r_{\Theta\alpha in}$, $r_{\Theta\beta i1}$, $r_{\Theta\beta i2}$, to $r_{\Theta\beta in}$, $r_{\Theta\gamma i1}$, $r_{\Theta\gamma i2}$, to $r_{\Theta\gamma in}$;

said creating the $F_i(p_{i1}, p_{i2}$, to $p_{in}, r_{\Theta\alpha i1}, r_{\Theta\alpha i2}$, to $r_{\Theta\alpha in}$, $r_{\Theta\beta i1}, r_{\beta i2}$, to $r_{\Theta\beta in}, r_{\Theta\gamma i1}, r_{\Theta\gamma i2}$, to $r_{\Theta\gamma in}, ax_i, by_i, cz_i, dt_i)$. of the time-based n-dimensional space-curves formula $F_i$ algorithm.

15. The method according to claim 14, said appending the time-based n-dimensional space-curves formula $F_i$ algorithm to the artificial intelligence neural network; said creating a time-based n-dimensional space-curves formula $F_i$ computation capability in the artificial intelligence neural network.

16. The method according to claim 2, ambiguity being; said ambiguous object; said ambiguous animal; said ambiguous motion; said ambiguous activity; said ambiguous gesture; said ambiguous behavior; said ambiguous interaction between human and object; said non-classable activities; said non-classable objects.

17. The method according to claim 2, using the time-based human activities universal processor; to solve ambiguity; said processing iteratively; said with relationship to the rich universal dictionary formatted as matrices element indices; said independent and identical in any language; said to limit wasting computing processing time; said the artificial intelligence analysis step is bypassed; said by only using the logic and contextual analysis; said to solve ambiguity; said if the ambiguity remains unsolved; said appending already gather information formatted as matrices element indices to the artificial intelligence neural network; said using the artificial intelligence neural network;

to solve ambiguity.

18. A method creating a rich set of object table formatted as matrices element indices; said with a set of human biometric; a set of pictures; silhouette and typical model for human; and many objects; said formatted as matrices element indices; said several field; said with category classification; said automotive; security; military; medical; machine to machine relationship; machine to human relationship; said for each category following specific mandatory rules formatted as matrices element indices; said with indices independently formatted as matrices element indices.

19. A method creating a rich universal dictionary table formatted as matrices element indices; said by associating and interlinking a rich word dictionary table formatted as matrices element indices; said to a rich set of object table formatted as matrices element indices; said interlinking the word matrices element indices independent of a language; said to the corresponding object matrices element indices independent of a language; said with identical matrices element indices; creating from the human activities; said a set of objects database information formatted as matrices element indices; said identifying each individual object with matrices element indices.

20. The method according to claim 18 where in the rich set of object dictionary; said in the rich word dictionary the word matrices element indices; said being independent; identical for any language; said the object matrices element indices objects; said being independent; said identical for any language; said the activity; motion; action; behavior matrices element indices; said independent; identical for any language; the rich set of object dictionary identical matrices element indices; said independent and identical for any language;

configuring the object and its corresponding word with elements indices with matrices element indices as $i_1$ to $i_n$; said positioning in the corresponding matrices; and tensor elements; said with subscript element indices $i_1$, $i_2$, to $i_n$; said with superscript indices as $j_1$, $j_2$ to $j_n$, $j_t$; said $j_t$ being the time-based indices.

21. The method according to claim 18 where in the reach universal dictionary; said interlinking the rich word dictionary table; said to the rich set of object dictionary table; said integrating the scaling rich word dictionary scheme; said for time scaling; verb conjugation; priority scaling scheme concept; sentiment comparative; said superlative scaling scheme concept; said the weighted and ranking element indices; said identical though all languages; said with numbers; real number; decimal number; integer; mathematical sets with distinct objects; said allowing logic operations;

creating in the rich set of object dictionary table; said for the object time scaling; verb conjugation; priority scaling scheme concept; sentiment comparative; said superlative scaling scheme concept; said the weighted and ranking element indices; said identical though all languages; said with numbers; real number; decimal number; integer; mathematical sets with distinct objects; said allowing logic operations.

22. The method according to claim 18 where in the rich universal dictionary; said appending some specific rule to follow; said such as automotive make and brand; driving code; driver license; insurance information; said traffic rule for several driving situation; said city; highway; motorway; of the road; racing; rain; snow.

23. A method creating a time-based look-out human activities apparatus; said this apparatus divided in two sub-apparatus; said a sub-apparatus including video camera; said with also night vision; thermal vision; said microphone; said GPS; said wireless; said RF-ID detector; said dedicated to acquiring all human activities; said as object time-based information formatted as matrices element indices; said a sub-apparatus; said with the capability to communicate in a LAN/WAN; said including a LAN/WAN transmitter; receiver apparatus; said with wireless; with Wi-Fi, Wi-Fi max; said with RF-ID based wireless transponder ability; said recognizing passive RF-ID tag; active RF-ID with a nano-battery; with an antenna ability to receive and to emit.

24. The method according to claim 23, where monitoring human activities with the time-based look-out human activities apparatus; said acquiring time-based-pictures, standard or accelerated monitoring frame speeds; said for human; animal; object position; motion; said therefore capturing and defining a delta-time t information formatted as matrices element indices;

identifying with time-based human activities behavior and activities formatted as matrices element indices.

25. The method according to claim 2, where; said an automotive with the time-based human activities universal processor; said dedicated to automotive; said in the artificial intelligence neural network; said adding several appending to its artificial intelligence neural network; said driving on rain; driving on snow; driving on ice; and many others driving conditions; said is loaded as an application; said on each automotive apparatus such as on-board computer; said with the time-based look-out human activities apparatus;

acquiring time-based human activities information formatted as matrices element indices.

26. The method according to claim 25, creating a temporary information module; said for storing as input the time-based set of objects database information formatted as matrices element indices; said as object formatted as matrices element indices; said road signal; traffic information; said formatted as matrices element indices; said speed; others automotive nearby; others vehicles; pedestrians nearby; said as time-based object information formatted as matrices element indices.

27. The method according to claim 26, installing a time-based information exchange module; said on each automotive time-based human activities universal processor; said on an apparatus; said such as the on-board computer; said having implemented a wireless LAN between all automotive; vehicles; said to act; said as correlating and comparing; said with all the many time-based information formatted as matrices element indices; said for each automotive; vehicle; pedestrian; said others objects; said intersection; with traffic rule; with road signal information; said formatted as matrices element indices.

28. The method according to claim 27 with having more time-based information than a human driver; using the time-based human activities universal processor dedicated to automotive; said implementing direct time-based exchange; said without requiring a centralize computing center; creating an artificial intelligence autonomous automotive.

29. The method according to claim 25, where automotive; vehicles are fitted with the time-based look-out human activities apparatus; said acquiring; identifying; said road; traffic; said identity of others vehicle and pedestrian time-based information; said formatted as matrices element indices; said each automotive; vehicles are fitted with the rich universal dictionary table; said with its time-based automotive identification; said to be recognized by other automotive; vehicles; said where, this time-based look-out human activities apparatus depends of the requirement; said with lower capability for pedestrian; bicycle; road signal; said to receive and to broadcast; said with the lowest status being a chip; said with only the capability to be identified for pedestrian; said with all in between configurations.

30. The method according to claim 25, where in an emergency driving situation; said in a potential automotive; vehicle accident; said with all time-based information formatted as matrices element indices from all vehicles; said with time-based correlation and comparison; said generating time-based mutual autonomous automotive driving action;

minimizing the impact; said up to avoiding the accident.

31. The method according to claim 25, where with; said automotive such as car; vehicle; emergency vehicle; military vehicle; truck and bus; said fitted with an onboard computer; said fitted with a time-based look-out human activities apparatus; said storing time-based information formatted as matrices element indices; said pedestrian; road signal; other objects; said to be fitted with identifying chip;

creating without heavy street; road and highway infrastructure; said an artificial intelligence autonomous automotive driving environment.

32. The method according to claim 25, where; said automotive or vehicles not fitted with the time-based look-out human activities apparatus; said automotive; vehicles fitted with the time-based look-out human activities apparatus; said using their time-based look-out human activities apparatus; said acquiring time-based information formatted as matrices element indices on the unfitted automotive or vehicles; said exchanging time-based information formatted as matrices element indices, on the un-fitted automotive or vehicles; said motion; behavior; said past; present; time-based behavior information formatted as matrices element indices; said using the time-based n-dimensional space-curves formula $F_i$ algorithm; said predicting future behavior; said with all the acquired information formatted as matrices element indices; said calculated time-based exchange information formatted as matrices element indices; said the automotive or vehicles fitted with the time-based look-out human activities apparatus;

taking accordingly time-based mutual action.

33. The method according to claim 2, said creating a standalone time-based human activities neural computing apparatus; said with a computing system; said with a CPU; said with memory; said with an operating system; said with storage capability; said output and input capability; said computing application capability; said advanced mathematic computation algorithm capability; said the time-based n-dimensional space-curves formula $F_i$ algorithm computation capability; said object mathematic conception; said with matrices element indices; said with tensors element indices; said incorporating the time-based look-out human activities apparatus; said monitoring human activities; said including task loads; said a mission, an many activities; said with time-based information formatted as matrices element indices; said using the time-based human activities universal processor; said generating the time-based human activities information formatted as matrices element indices; said identical and independent of a language;

creating time-based human activities sub-parsing groups formatted as matrices element indices.

34. The method according to claim 33, said with the time-based information exchange module; said gathering several time-based human activities sub-parsing group; said with the contextual and ranking module several time-based correlation; said n-dimensional tensor with its element indices; said extracting; several time-based information formatted as matrices element indices; said time-based escalating concept sentiment; time-based scaling priority; time-based anomalous word understanding; time-based ranking information formatted as matrices element indices; said that can be understood by a machine;

generating a time-based information report formatted; said as time-based matrices element indices; said as time-based tensors element indices.

35. The method according to claim 34, with the time-based human activities universal processor; said dedicated to natural language analysis; said converting information formatted as time-based matrices element indices; said to a text; said using a text to voice conversion module; said understanding a voice message; said that can be understood by a human generating; said time-based voice message information.

36. The method according to claim 33, where the time-based neural computing apparatus is integrated; said in an autonomous machine; said fitted with its time-based information module; said creating an independent machine; said with more time-based information; said than a human will ever have; said investigating; said time-based task load; said time-based thing to do; said assessing the time-based work load requirement; said accomplishing; said the time-based task load; said time-based thing to do; said replacing a human;

generating a time-based information report formatted as tensors element indices.

37. The method according to claim 33, said with time-based task load; said time-based thing to do requiring; said several machines; said with mobility; said work load performing capability; said every machine is equipped with the time-based neural computing apparatus; said fitted with its time-based information module; said with its time-based information report formatted as tensors element indices; said fitted with the time-based information exchange module; said with the gathering of all machine time-based information report formatted as tensors element indices; said using the time-based human activities universal processor; said with the contextual and ranking module; said time-based correlation n-dimensional tensor with its element indices; said assessing; said time-based task load; said time-based thing to do; said requirement to accomplish; said time-based task load; said time-based thing to do; said implementing; said monitoring; said time-based task load; said time-based thing to do;

distributing the time-based work load among every autonomous machine.

38. The method according to claim 33 where the time-based work load distribution among every machine; said as a human will have implemented; said that time-based work load distribution; said includes timing; accomplishment; scheduling; milestone; said that not meeting time-based task load accomplishment;

generating and modifying the time-based task load distribution; said taking any time-based corrective action.

39. The method according to claim 33 investigating human activities; said using the time-based human activities universal processor; said with the time-based n-dimensional space-curves formula $F_i$ algorithm; said dedicated for motion and tracking object; said with the time-based look-out human activities apparatus; said tracking object motion; said being an object; a human; an animal; a vehicle; said object $O(i_1, i_2, i_3)$; said using an iterative process calculating with observed time-based object positions $P_i$ set $P_1(x_1, y_1, z_1, t_1)$; said the initial $p_{11}, p_{21}, p_{w1}$, a, b, c, d parameters; said using these $p_{11}, p_{21}, p_{w1}$, a, b, c, d parameters in the time-based n-dimensional space-curves formula $F_i$ algorithm; said calculating and determining the object $P_2(x_2, y_2, z_2)$ proposed position; said with the real observed position $P_2(x_2, y_2, z_2, t_2)$; said with these two sets of parameters; said iteratively said calculating and optimizing these parameters; said to fit to the real observed object position; said to a new $P_n(x_n, y_n, z_n, t_n)$; said then repeating the iteration with new observed position; said incorporating this $P_n$ in parameters in the time-based n-dimensional space-curves formula $F_i$; said processing iteratively; said modifying and determining new $p_{i1}, p_{i2}, p_{iw}$, a, b, c, d parameters generating for time $t_x$ the time-based n-dimensional space-curves formula $F_i$ algorithm.

40. The method according to claim 39 with using said an object $O(i_1, i_2, i_3)$; said being an object; a human; an animal; a vehicle; said integrating the time $t_x$; said in the object trail-motion time-based n-dimensional space-curves $F_i$ algorithm;

predicting position for time $t_x$, position (g) with $P_x(x_s, y_s, z_s, t_g)$ formatted as matrices element indices.

41. The method according to claim 39, said the object is not showing at a probable position (g); said with matrices element indices $P_g(x_s, y_s, z_s, t_s)$; said the object has disappeared; said identifying an ambiguity; said using the artificial intelligence neural network analysis to solve this ambiguity;

proposing an answer.

42. The method according to 39, said a human is not discovered at a predicted position (g); said with matrices element indices $P_g(x_s, y_s, z_s, t_s)$; said the human has disappeared; said identifying an ambiguity; said using the artificial intelligence neural network analysis; said in relationship with the bio-metric database; said of the rich universal dictionary table; said to solve this ambiguity;

proposing an answer; said human has changed presentation.

43. The method according to claim 39, said using the time-based n-dimensional space-curves formula $F_i(p_{i1}, p_{i2}, $ to $p_{in}, r_{\Theta\alpha i1}, r_{\Theta\alpha i2},$ to $r_{\Theta\alpha in}, r_{\Theta\beta i1}, r_{\beta i2},$ to $r_{\Theta\beta in}, r_{\Theta\gamma i1}, r_{\Theta\gamma i2},$ to $r_{\Theta\gamma in}, ax_i, by_i, cz_i, dt_i)$; said with the $r_{\Theta\alpha i1}, r_{\Theta\alpha i2},$ to $r_{\Theta\alpha in}, r_{\Theta\beta i1}, r_{\beta i2},$ to $r_{\Theta\beta in}, r_{\Theta\gamma i1}, r_{\Theta\gamma i2},$ to $r_{\Theta\gamma in}$ parameters; said linking to motion and behavior rotation; said an object being an object; an human, an animal, a vehicle;

describing object behavior; said with n-dimensional space motion and rotation.

44. The method according to claim 39, said using the time-based n-dimensional space-curves formula $F_i(p_{i1}, p_{i2},$ to $p_{in}, r_{\Theta\alpha i1}, r_{\Theta\alpha i2},$ to $r_{\Theta\alpha in}, r_{\Theta\beta i1}, r_{\beta i2},$ to $r_{\Theta\beta in}, r_{\Theta\gamma i1}, r_{\Theta\gamma i2},$ to $r_{\Theta\gamma in}, ax_i, by_i, cz_i, dt_i)$; said for time $t_g$; said an object being an object; a human, an animal, a vehicle;

said predicting n-dimensional space object behavior.

45. The method according to claim 39, said an object with position $P_1(x_1, y_1, z_1)$ and a based-time $J_{t1}$ is moving to position $P_2(x_2, y_2, z_2)$ with a based-time $J_{t2}$; said the object moving the space-curves segment length $L_{12}$; said in a delta time $\Delta t_{12}$; said calculating the exact distance $L_{12}$; said from many object 1 to n time-video frame (or other time-based) moving information; said acquiring between object image length step $\delta l_{1i}$; said being linear, plane, ascensional and rotation motion; said from $P_1$ to $P_2$ as $\delta l_{1i}$ to $\delta l_{1n1}$; said using the time-based n-dimensional space-curves formula $F_i(p_{i1}, p_{i2},$ to $p_{in}, r_{\Theta\alpha i1}, r_{\Theta\alpha i2},$ to $r_{\Theta\alpha in}, r_{\Theta\beta i1}, r_{\Theta\beta i2},$ to $r_{\Theta\beta in}, r_{\Theta\gamma i1}, r_{\Theta\gamma i2},$ to $r_{\Theta\gamma in}, ax_i, by_i, cz_i, dt_i)$; said compiling the $\delta l_{1i}$ to $\delta l_{1n}$ of the object; said moving on the space curves; said determining the exact distance $L_{12}$; said by dividing $L_{12}$ by $\Delta t_{12}$;

calculating between $P_1$ to $P_2$ the object average speed information $S_{12}$ formatted as matrices element indices.

46. The method according to claim 45, said a moving object; said using the time-based n-dimensional space-curves formula $F_i(p_{i1}, p_{i2},$ to $p_{in}, r_{\Theta\alpha i1}, r_{\Theta\alpha i2},$ to $r_{\Theta\alpha in}, r_{\Theta\beta i1}, r_{\beta i2},$ to $r_{\Theta\beta in}, r_{\Theta\gamma i1}, r_{\Theta\gamma i2},$ to $r_{\Theta\gamma in}, ax_i, by_i, cz_i, dt_i)$; said the object with position $P_1(x_1, y_1, z_1)$ and a based-time $J_{t1}$ is moving to position $P_2(x_2, y_2, z_2)$ with a based-time $J_{t2}$; said the object moving the space-curves segment length $L_{12}$; said in a delta time $\Delta t_{12}$; said moving on the space curves; said with the object speed information $S_{12}$ formatted as matrices element indices; said the object with position $P_3(x_3, y_3, z_3)$ and a based-time $J_{t3}$ is moving to position $P_4(x_4, y_4, z_4)$ with a based-time $J_{t4}$; said the object moving the space-curves segment length $L_{34}$; said in a delta time $\Delta t_{34}$; said moving on the space curves; said with the object speed $S_{34}$ formatted as matrices element indices; said by correlating the time-based object average speed information $S_{12}$ formatted as matrices element indices; said to the time-based object speed information $S_{34}$ formatted as matrices element indices;

calculating between several space-curves segment length the object acceleration; deceleration information $\gamma_{14}$ formatted as matrices element indices.

* * * * *